Sept. 22, 1959  M. A. KENDALL ET AL  2,905,100
SYSTEM OF PASSENGER TRANSPORTATION
Filed Aug. 1, 1955  18 Sheets-Sheet 12
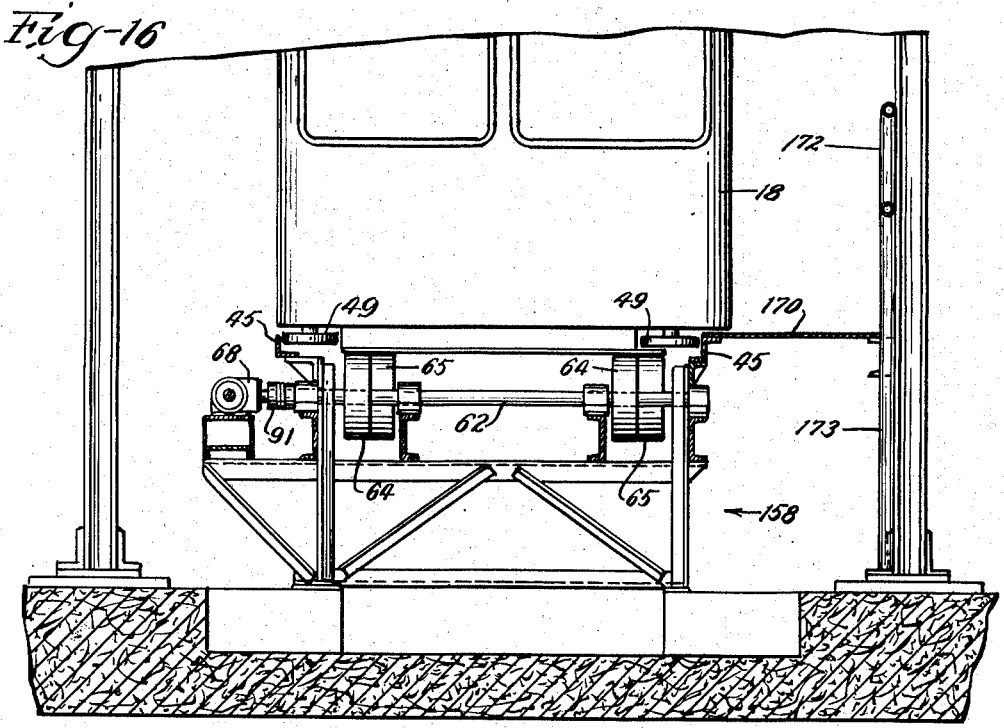
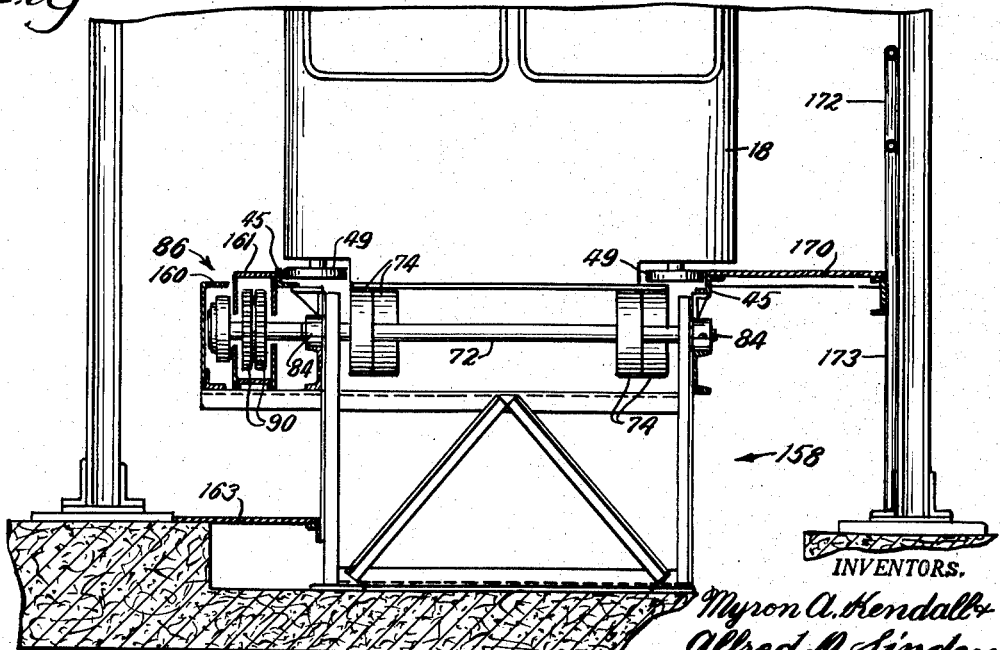
INVENTORS.
Myron A. Kendall &
Alfred D. Sinden
By:- Mann, Brown and Hanaman
Attys.

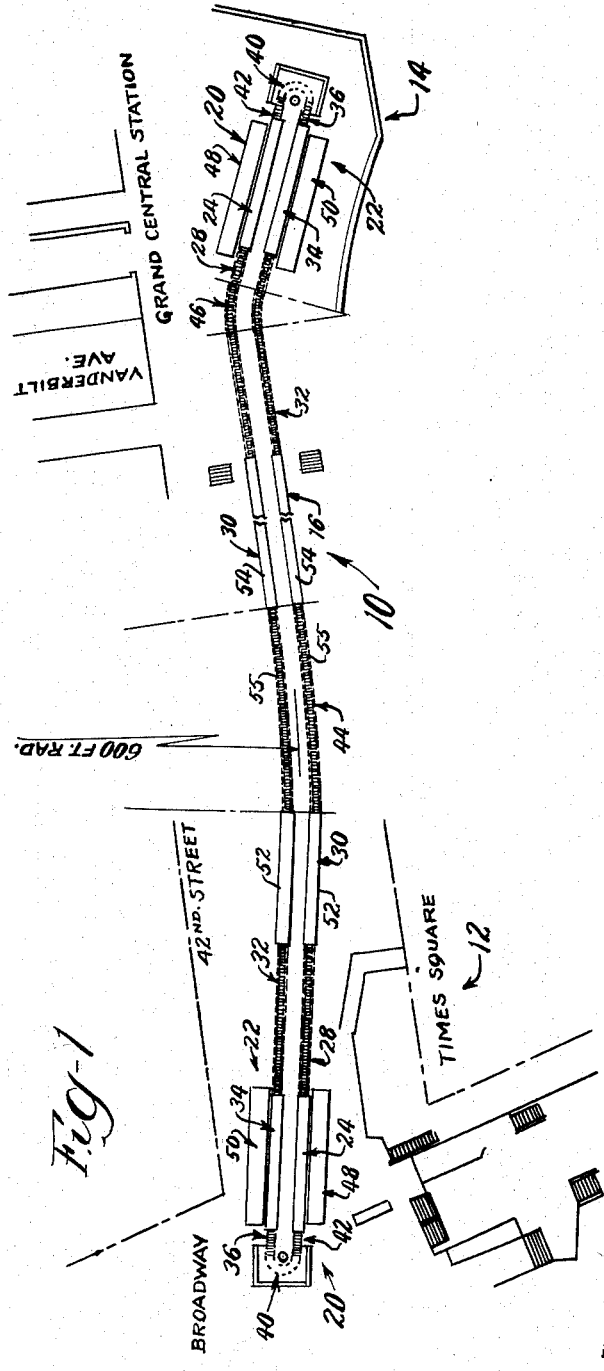

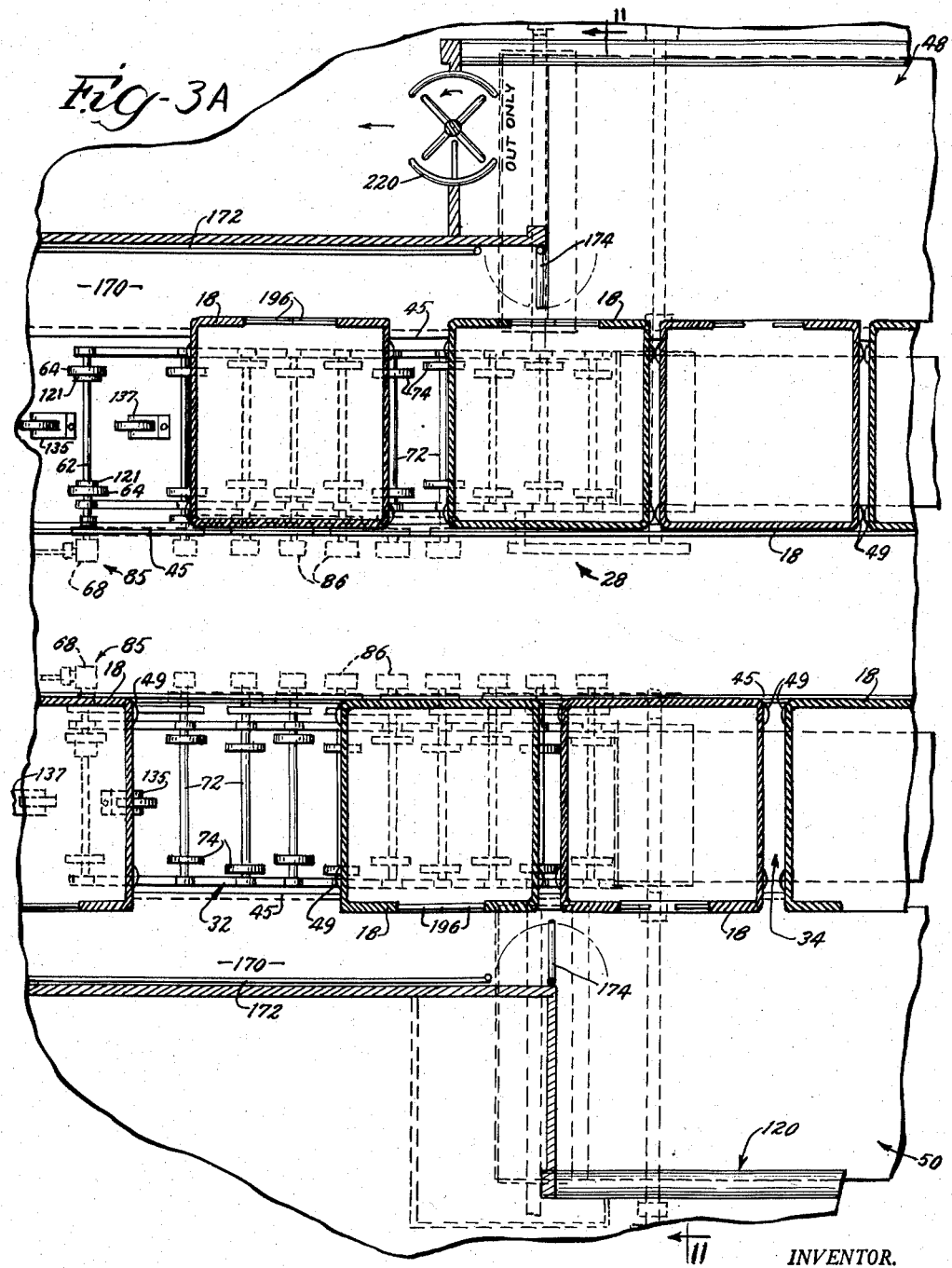

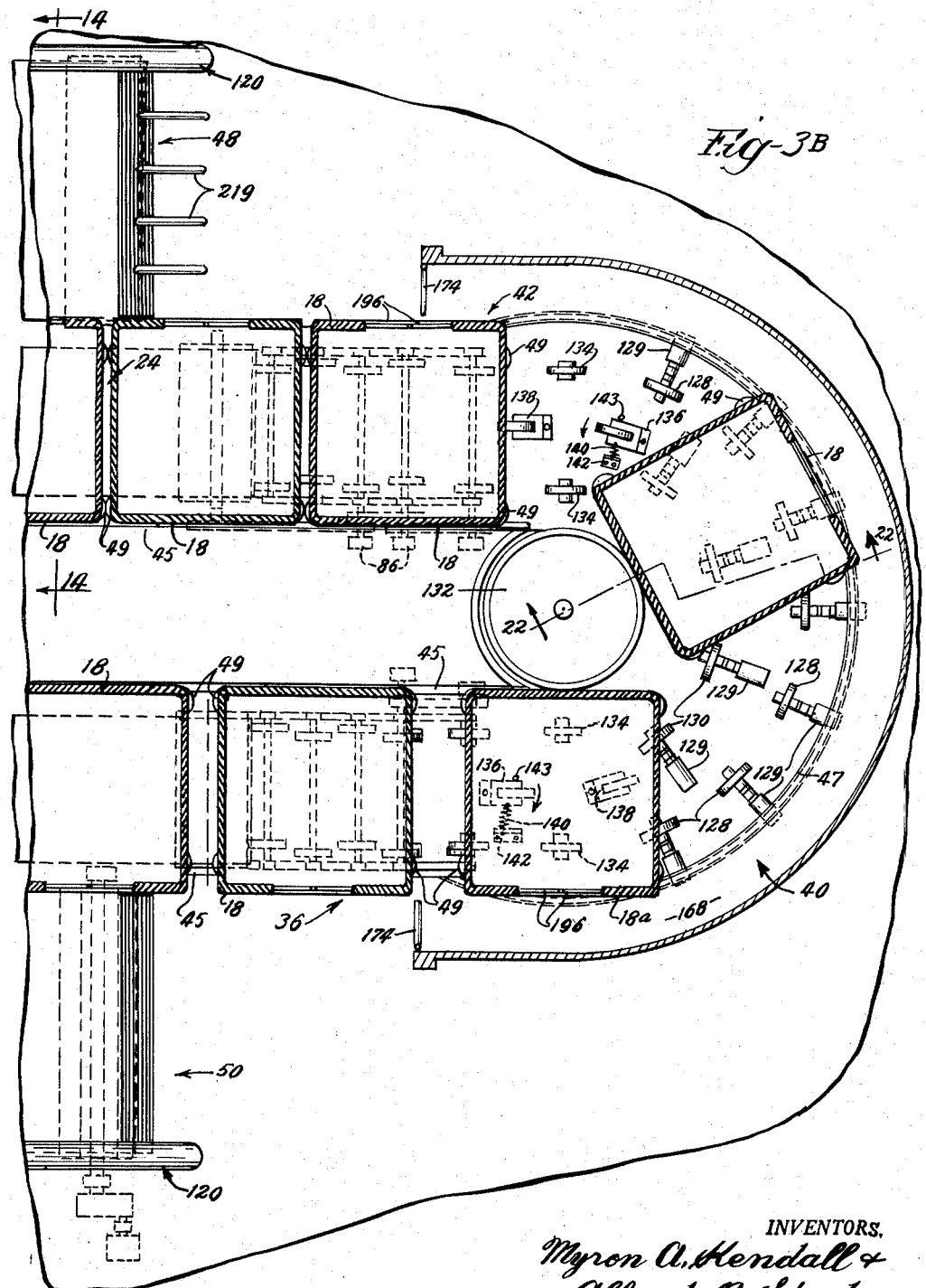

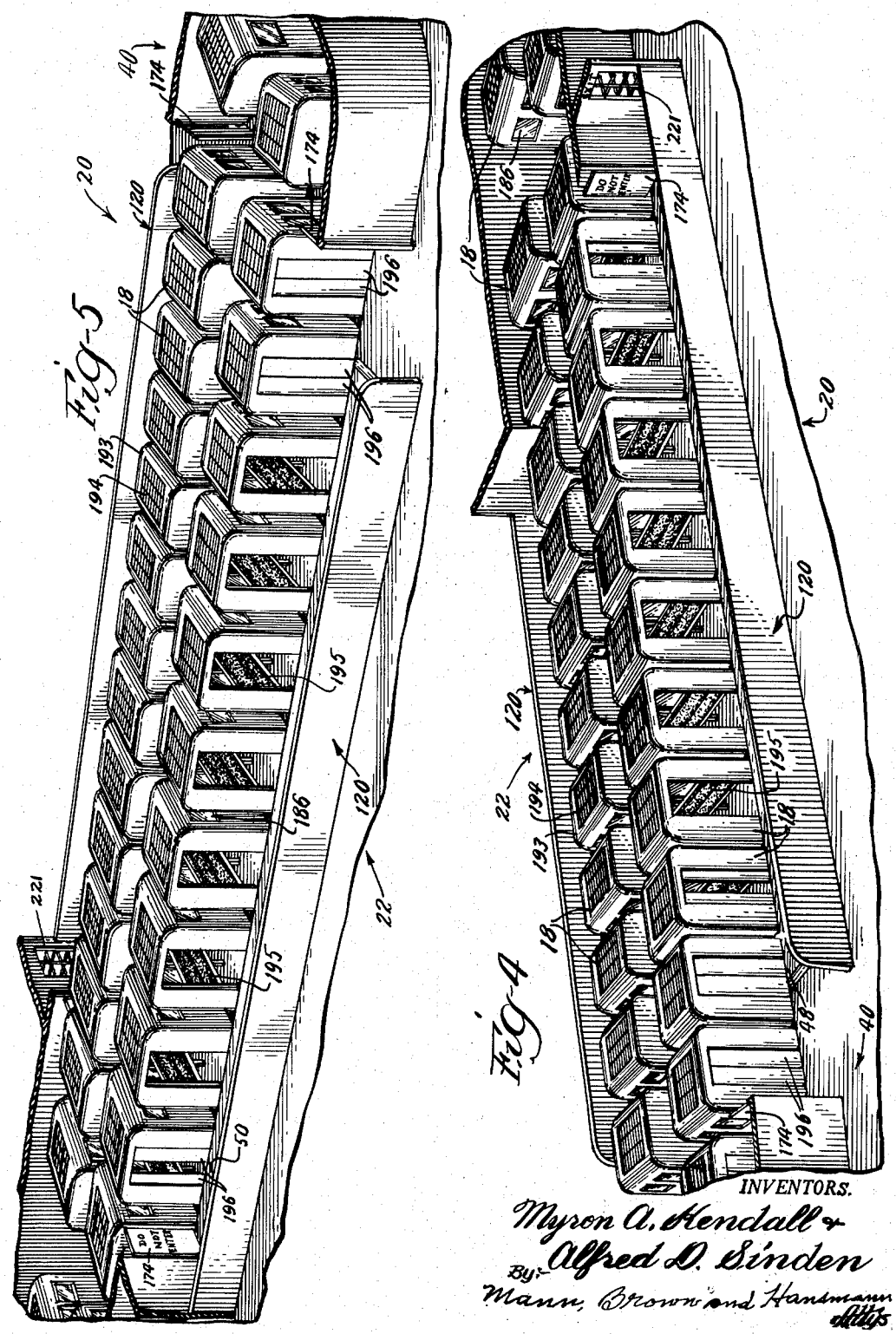

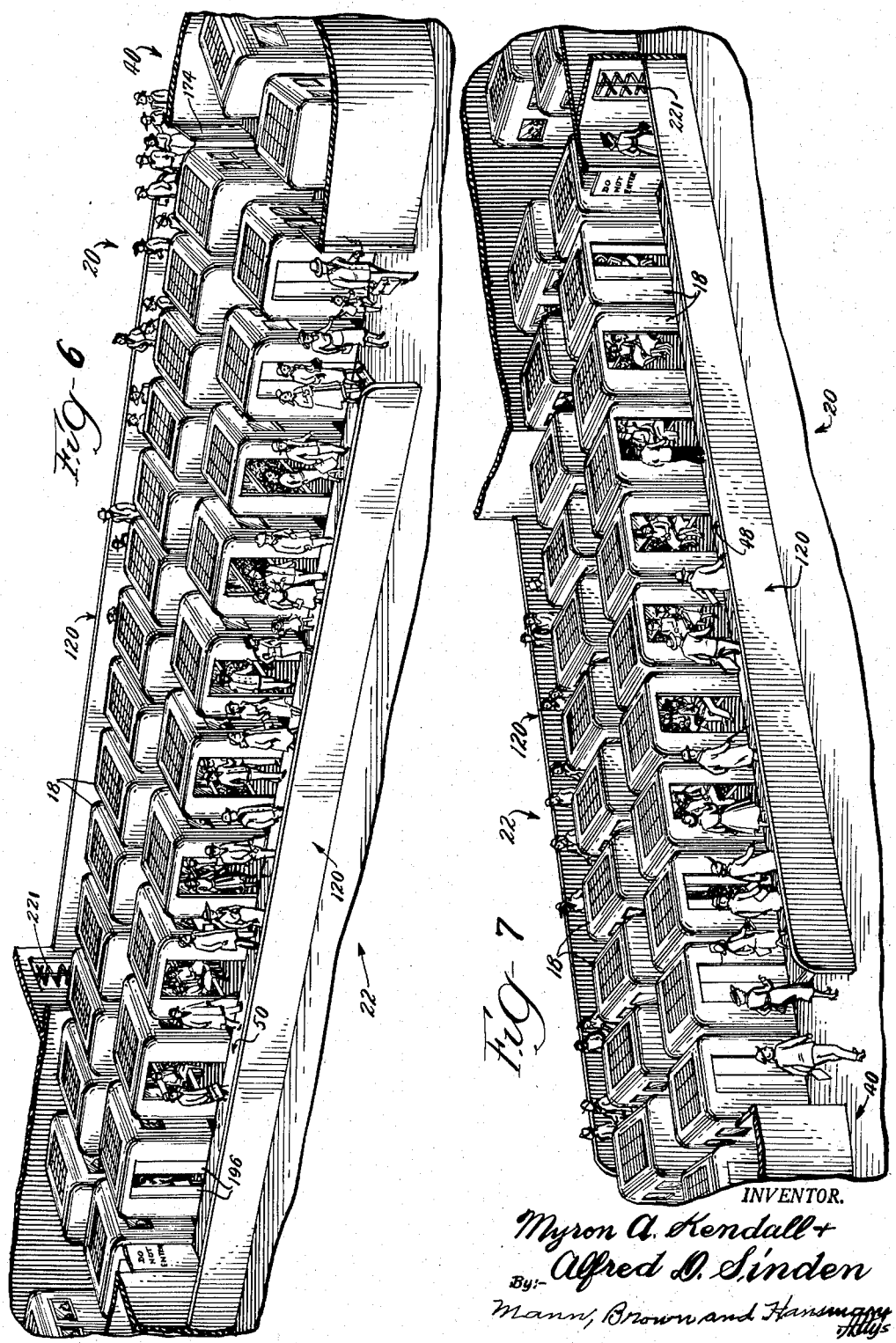

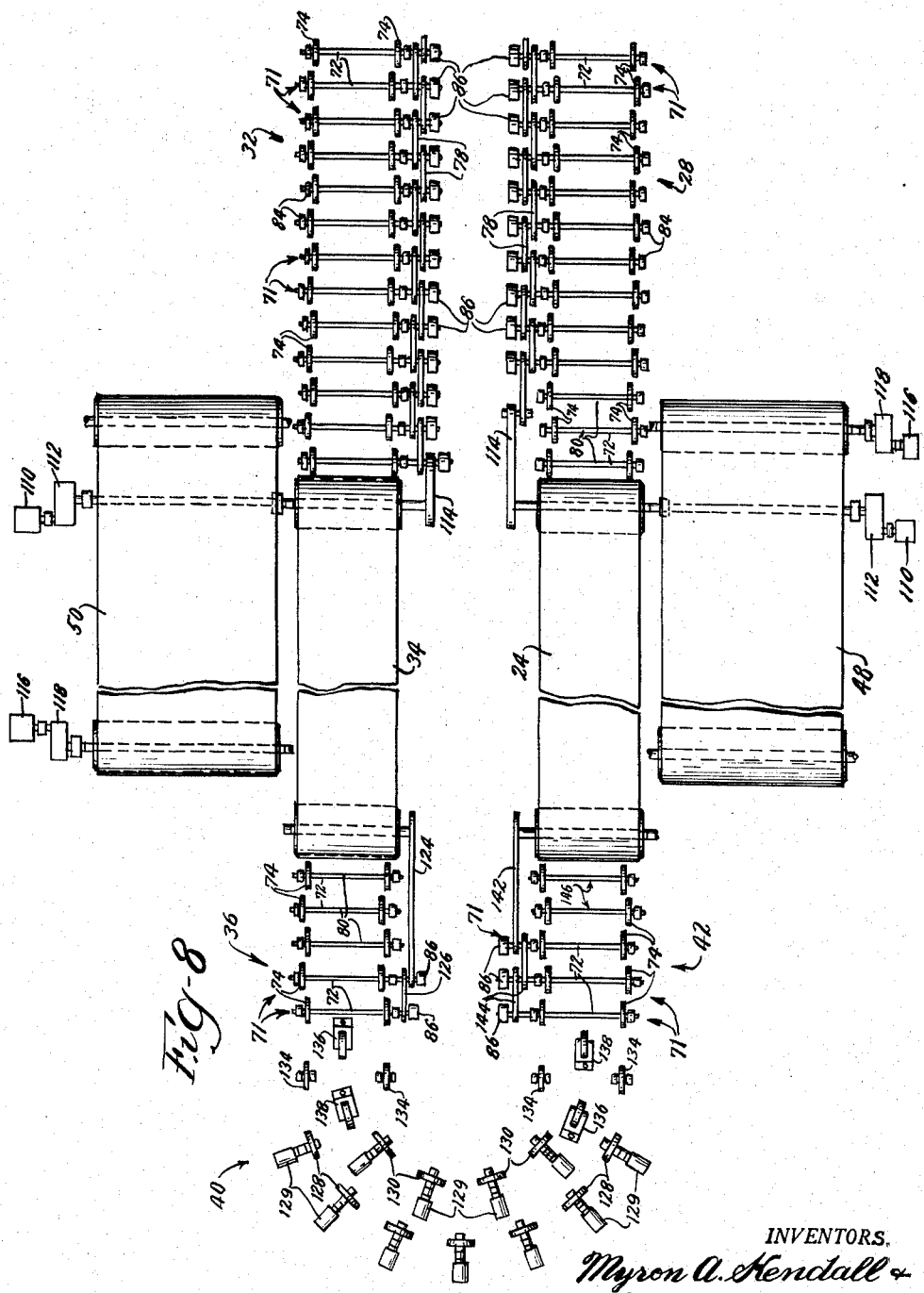

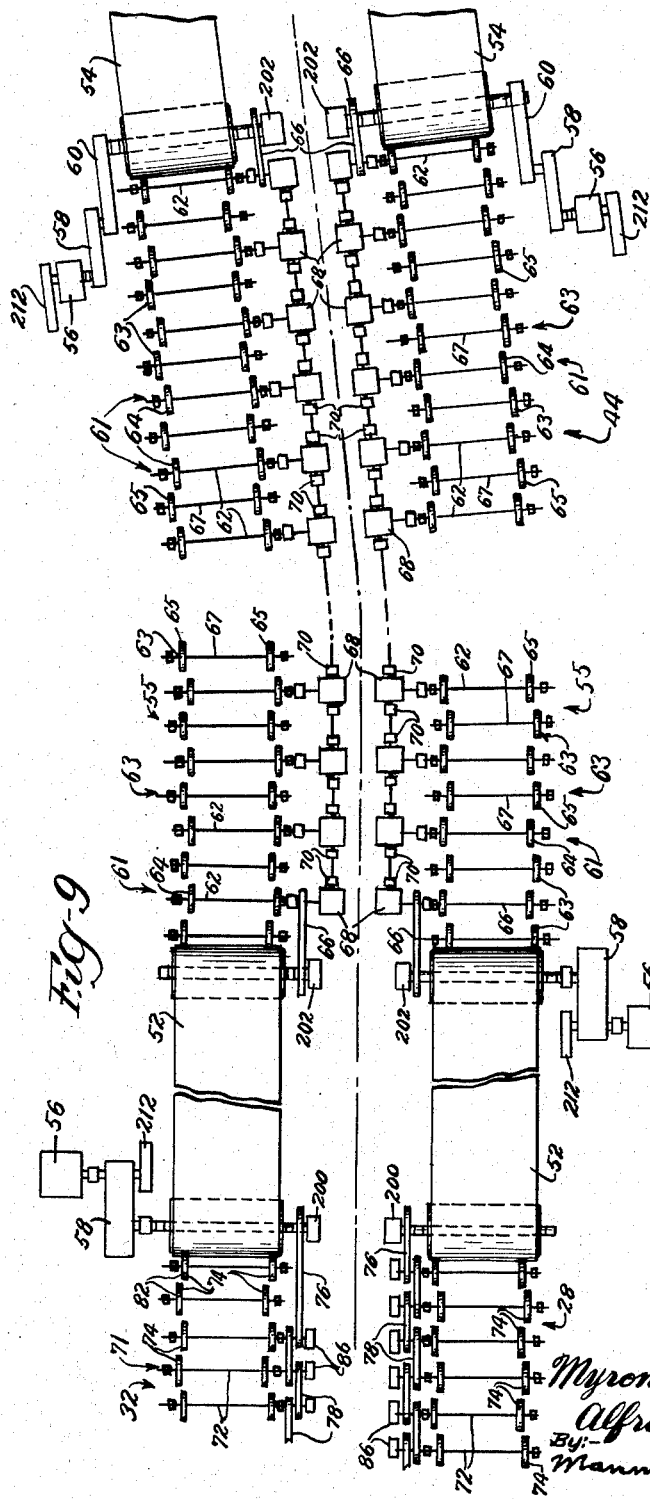

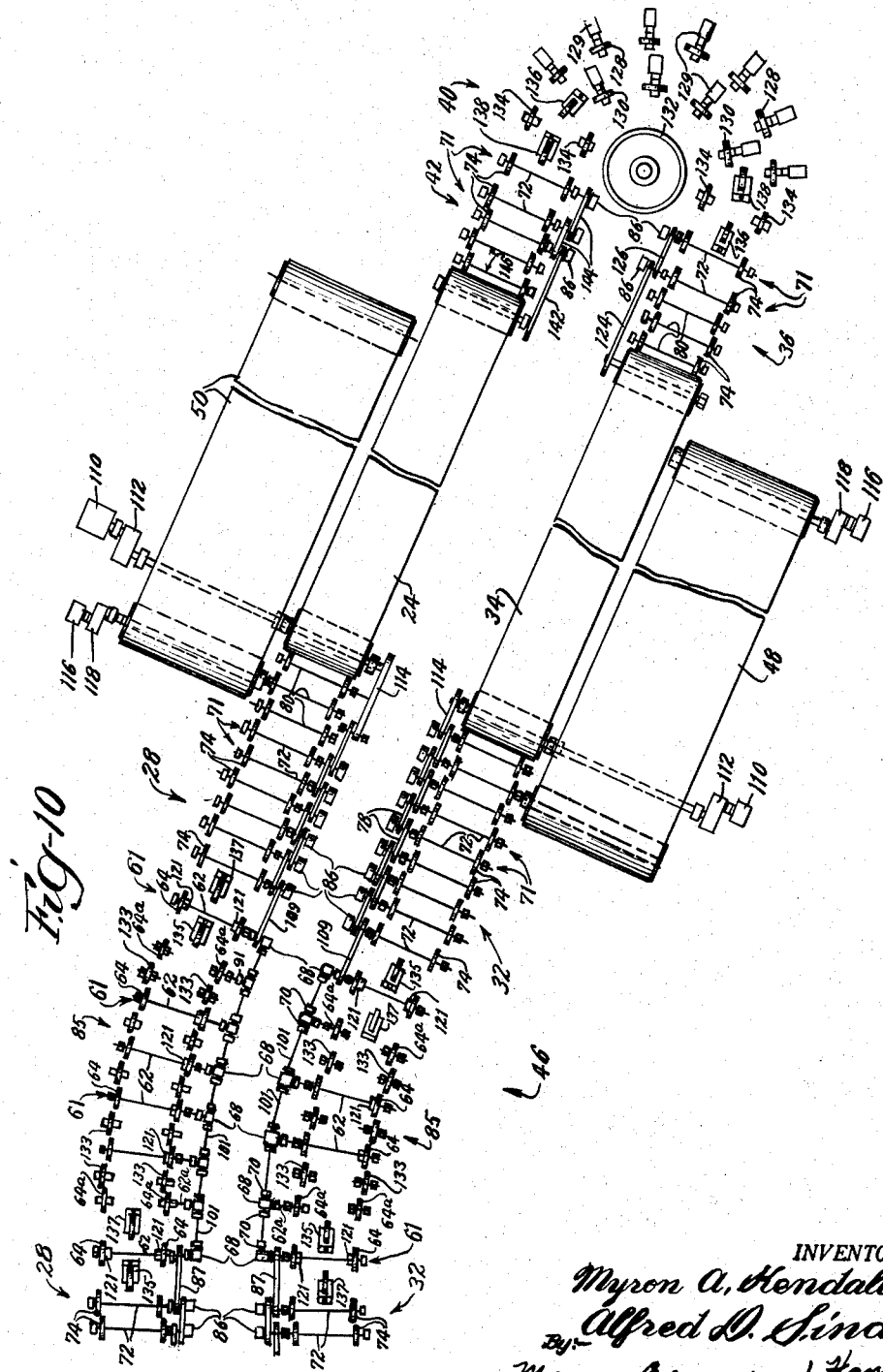

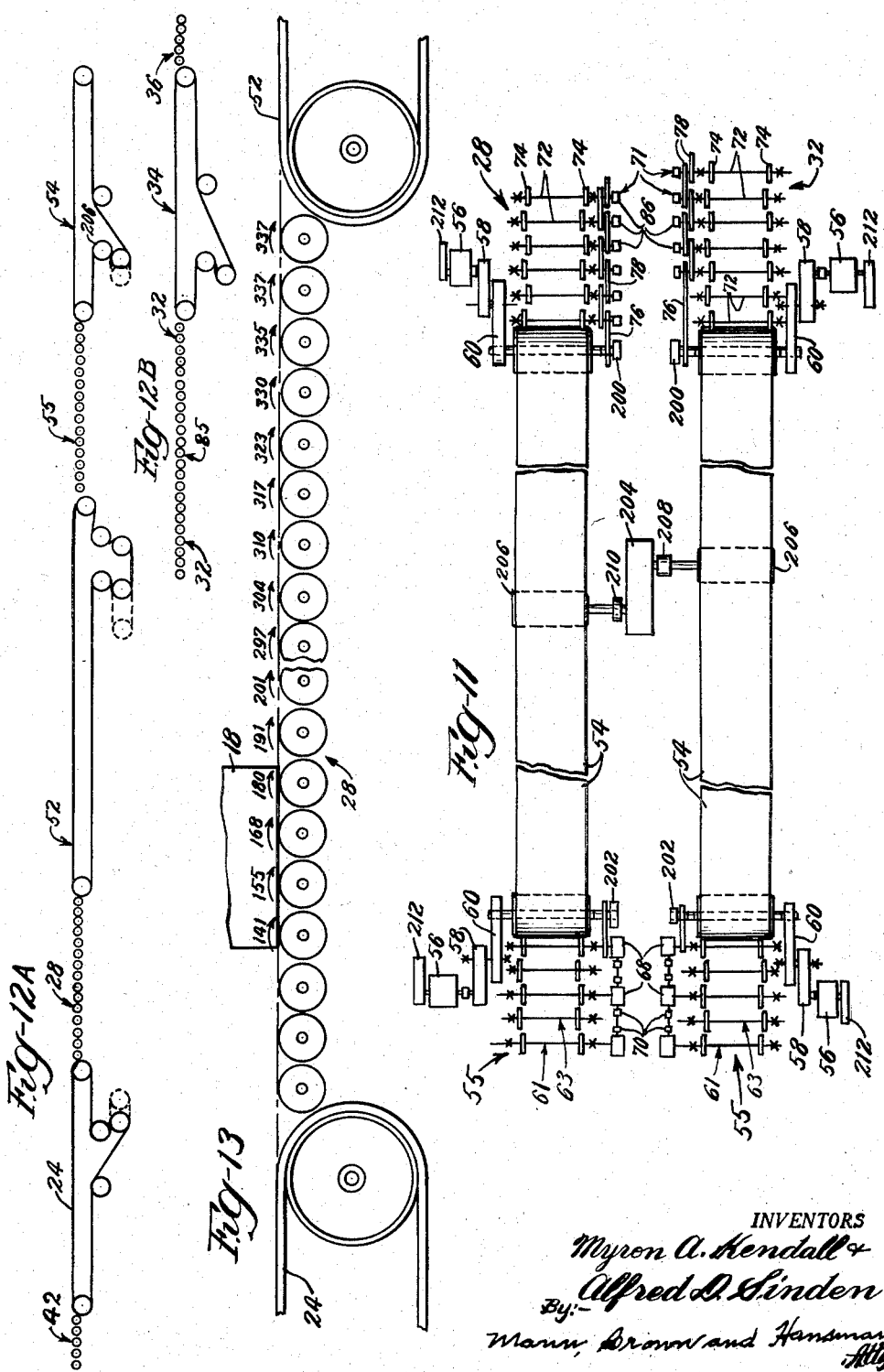

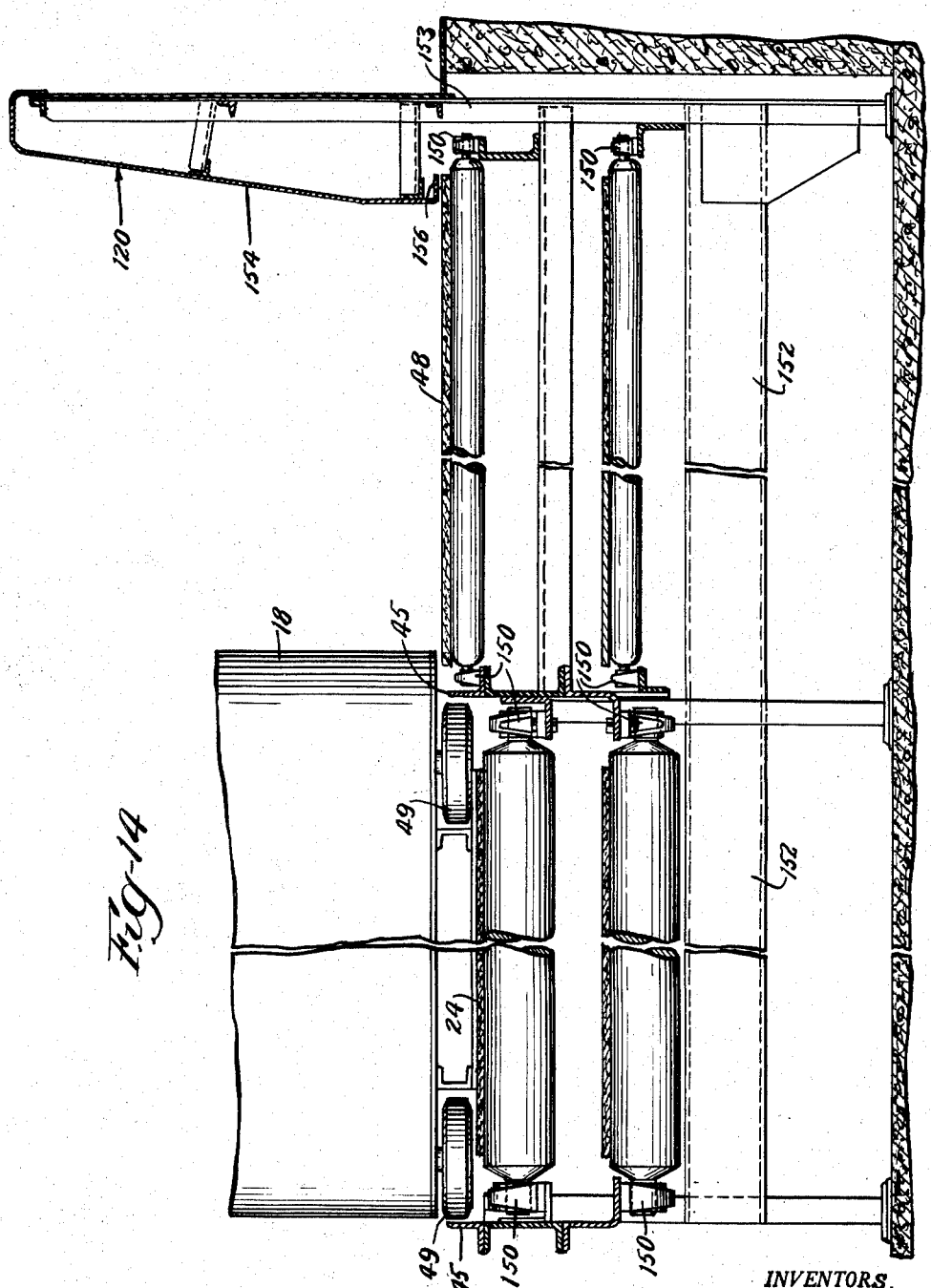

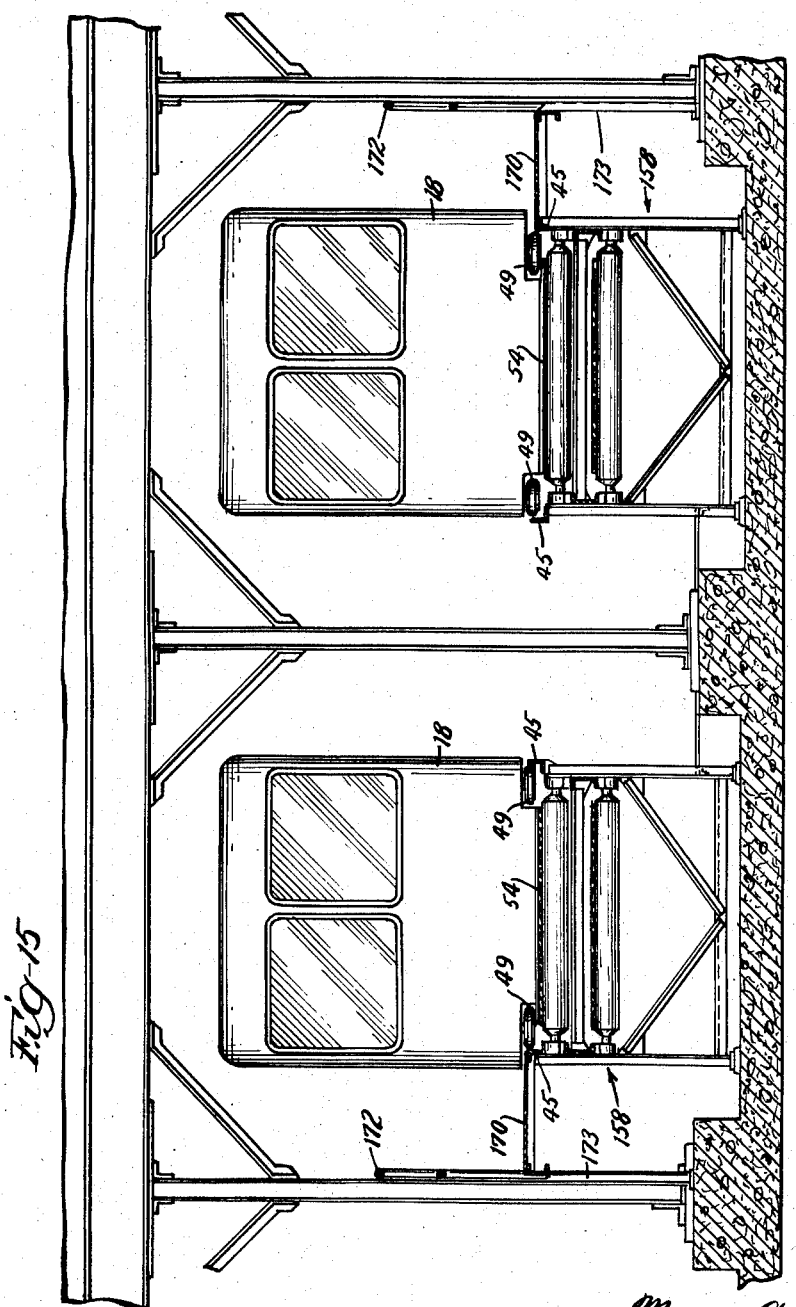

Sept. 22, 1959     M. A. KENDALL ET AL     2,905,100
SYSTEM OF PASSENGER TRANSPORTATION
Filed Aug. 1, 1955     18 Sheets-Sheet 13
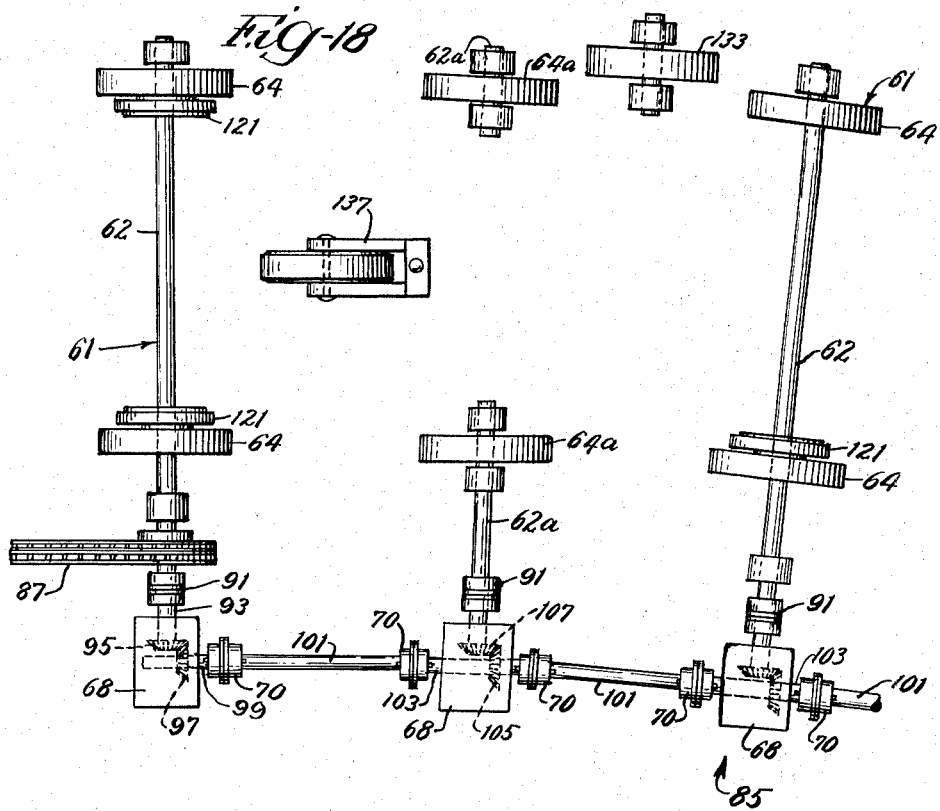
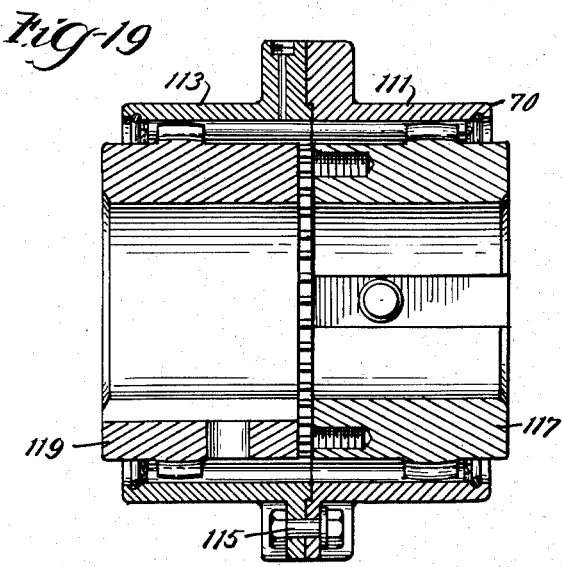
INVENTORS
Myron A. Kendall &
Alfred D. Sinden
By:— Mann, Brown and Hansmann

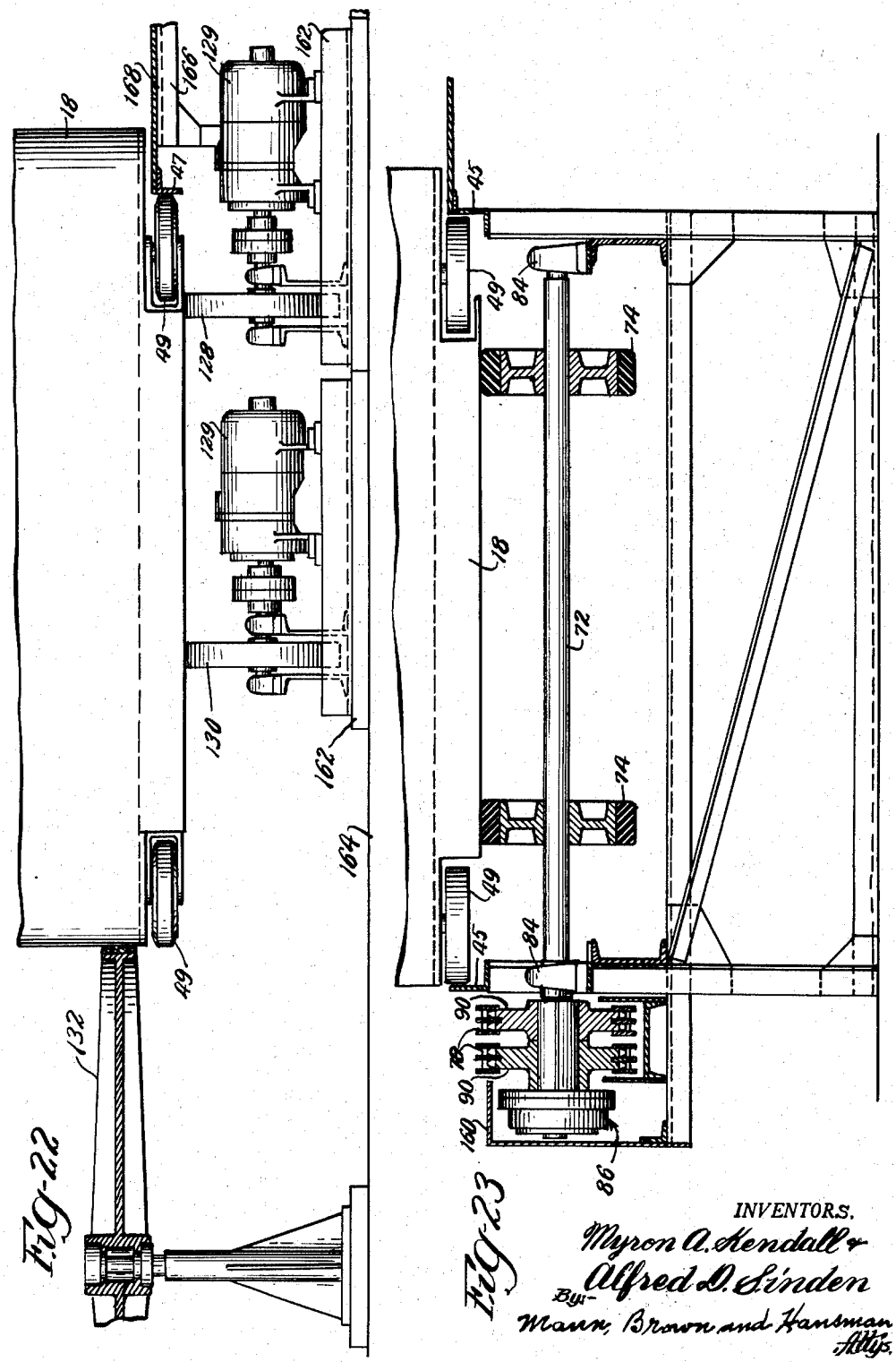

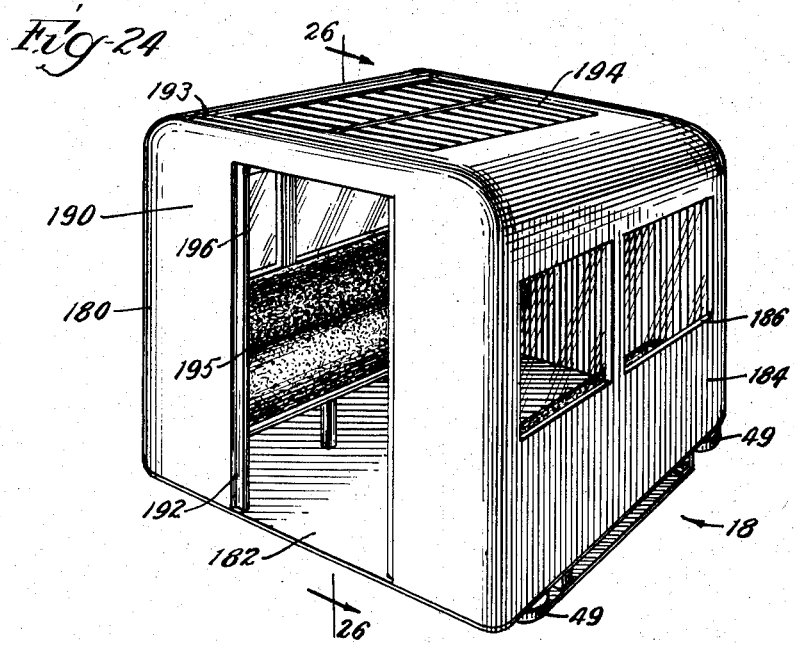
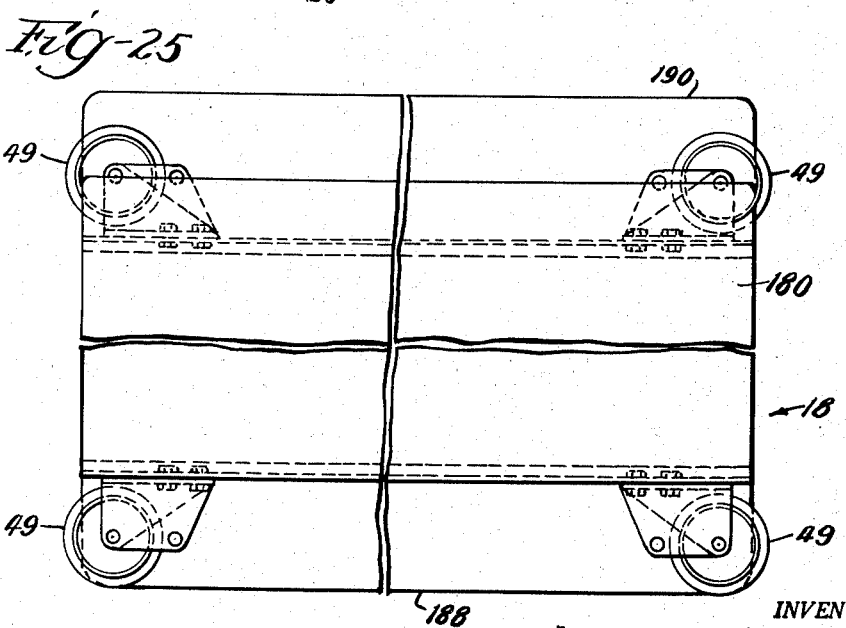

Sept. 22, 1959     M. A. KENDALL ET AL     2,905,100
SYSTEM OF PASSENGER TRANSPORTATION
Filed Aug. 1, 1955     18 Sheets-Sheet 17
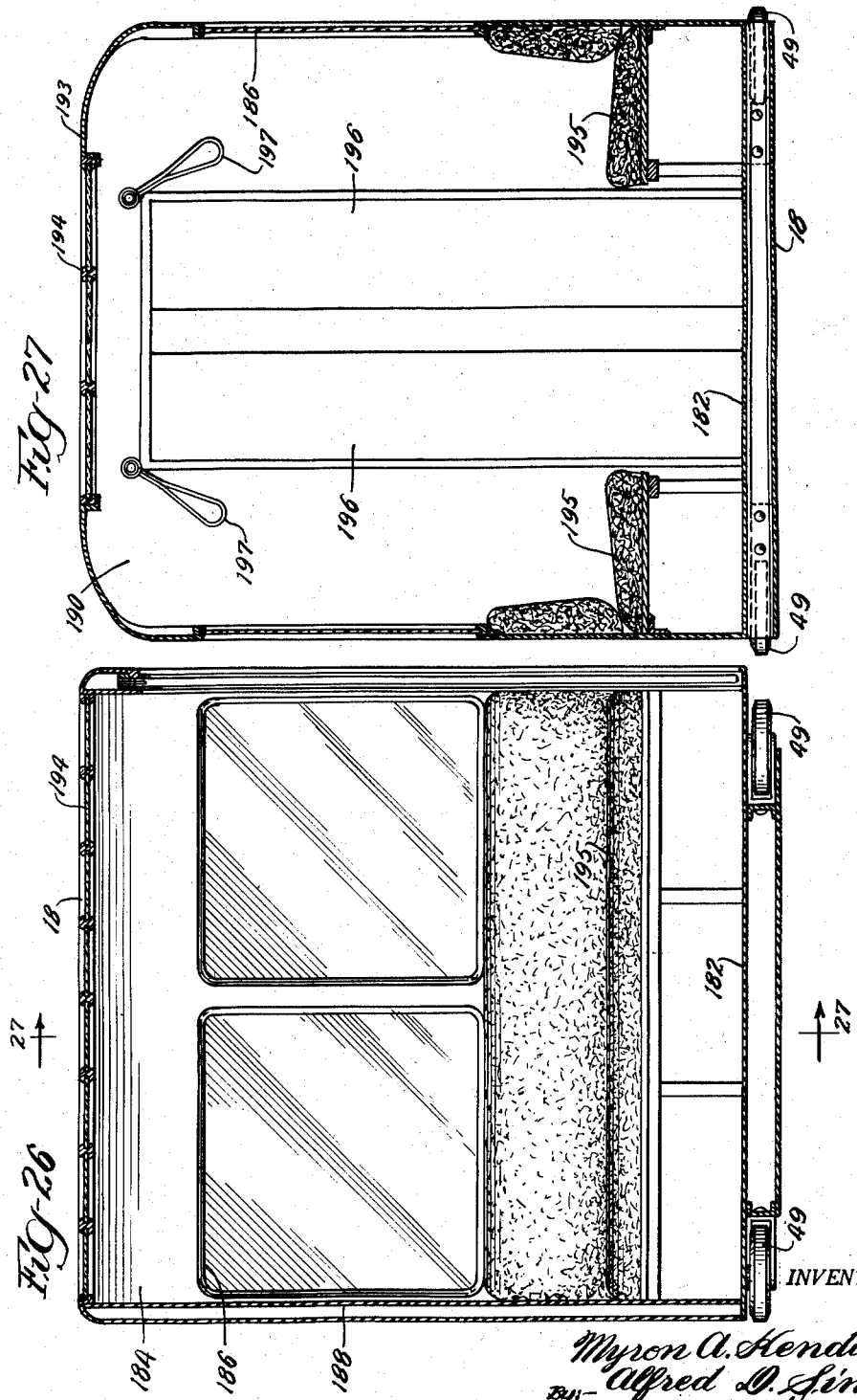
INVENTORS.
Myron A. Kendall &
Alfred D. Linden
By: Marvin, Brown and Hansmann Sept. 22, 1959    M. A. KENDALL ET AL    2,905,100
SYSTEM OF PASSENGER TRANSPORTATION
Filed Aug. 1, 1955    18 Sheets-Sheet 18
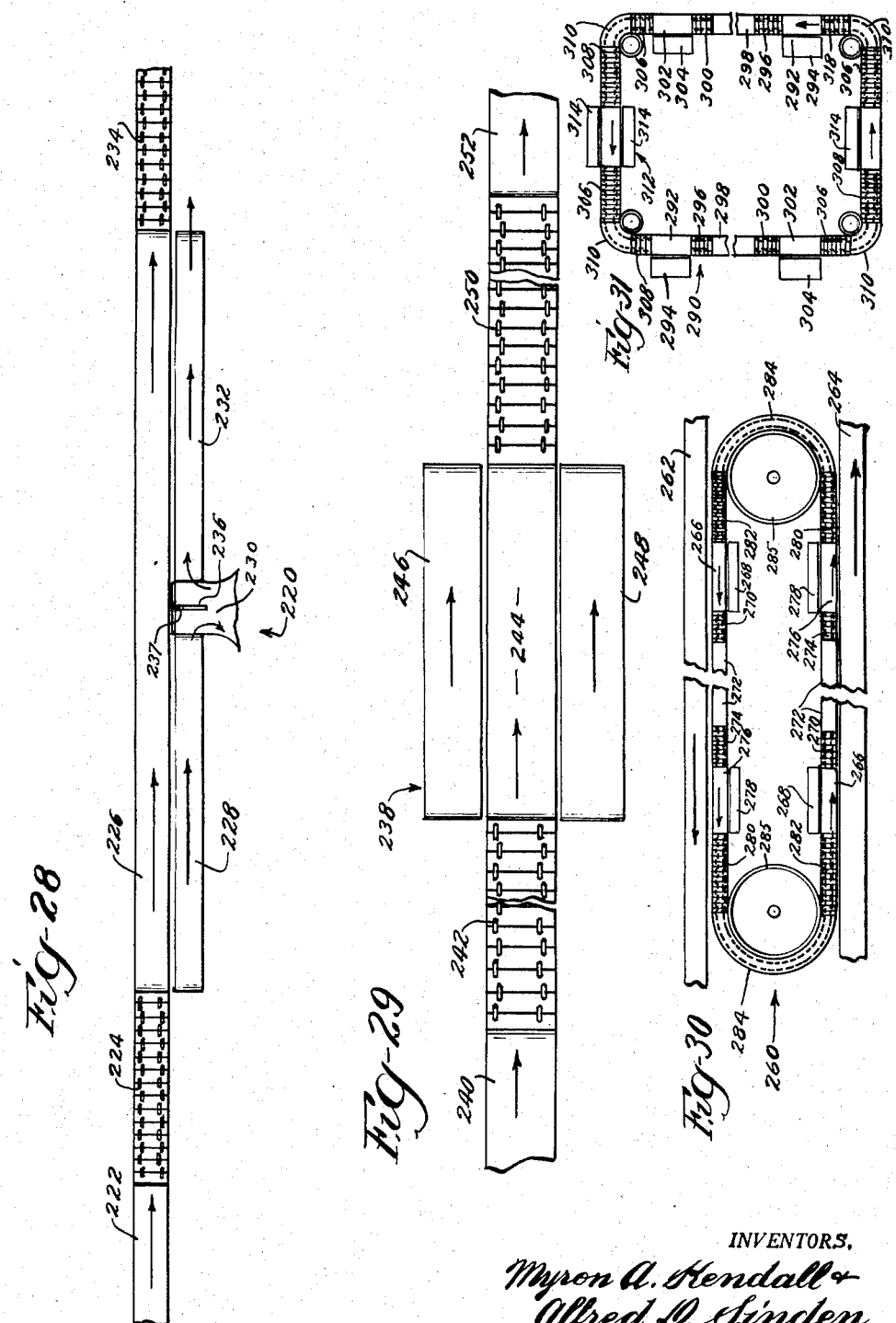
INVENTORS.
Myron A. Kendall &
Alfred D. Sinden
By:- Mann, Brown and Hansmann
Attys.

United States Patent Office

2,905,100
Patented Sept. 22, 1959

2,905,100

SYSTEM OF PASSENGER TRANSPORTATION

Myron A. Kendall and Alfred D. Sinden, Aurora, Ill., assignors to Stephens-Adamson Mfg. Co., a corporation of Illinois Application August 1, 1955, Serial No. 525,523

18 Claims. (Cl. 104—25)

Our invention relates to a system of passenger transportation, and, more specifically, to a passenger transportation system particularly adapted for use in moving heavy passenger traffic in congested areas.

In our copending applications Serial No. 191,274, now Patent No. 2,756,686 dated July 31, 1956 filed October 20, 1950, and Serial No. 369,036, filed July 20, 1953, of which this application is a continuation-in-part, we disclose a system of passenger transportation including apparatus comprising a series of conveyors aligned to form an endless circuit, and a series of continuously moving passenger cabs conveyed about said circuit at varying speeds by said conveyors. The disclosures of said applications are hereby incorporated herein by reference in interests of brevity. The present disclosure includes the basic principles described in said applications as well as certain improvements which materially add to the efficiency of operation and the overall effectiveness of our new system of passenger transportation.

The principal object of the invention is to provide a mass passenger transportation system which makes practical continuous and automatic loading, transporting, and unloading of passengers on the scale required to handle passenger traffic in modern populous centers.

In accordance with the teachings of the invention, we provide a series of conveyors aligned in an endless circuit, which extends between and past stations at which loading and unloading take place, and a series of passenger cabs supported on and conveyed by said conveyors, said cabs continuously moving about said circuit. The circuit includes a low speed conveyor adjacent each station, high speed conveyors extending most of the distance between spaced apart stations, and speed adjusting conveyors for transferring the cabs between the low and high speed conveyors. Preferably, a low speed moving platform is positioned alongside each of said low speed conveyors, said moving platforms moving at the same speed, or substantially the same speed, as the respective low speed conveyors.

One desiring to board the system steps from a stationary platform or ramp to a moving loading platform adjacent one of the low speed conveyors, much as one would board an escalator, and then walks toward the series of cabs carried by the low speed conveyor and passing the station at the same speed, or substantially the same speed, at which the passenger is now moving. Selecting a cab, the passenger enters and sits down. The cab carrying the passenger is conveyed to a speed adjusting conveyor, which brings the speed of the cab up to the speed of, and conveys the cab to, the high speed conveyor that extends between the station at which the passenger entered and the next station. In advance of the next station, the cab is received on a second speed adjusting conveyor, which brings the speed of the cab down to the speed of, and conveys the cab to, the low speed conveyor adjacent the next station. The cab is then conveyed past this station while on the last mentioned low speed conveyor, and the passenger, if desiring to disembark from the system, steps from the moving cab to the adjacent moving platform and thence steps from the moving platform to a stationary ramp or platform in much the same way that one would step from an escalator.

In this application the system is illustrated as replacing the shuttle cars between Grand Central Station and Times Square at 42nd Street and Broadway in New York City New York. In the apparatus employed for this purpose, the circuit takes the form of two sets of conveyors traveling in opposite directions, with each set of conveyors including a main high speed endless belt type conveyor, a low speed endless belt type loading conveyor spaced from the cab receiving end of the main high speed conveyor, a low speed endless belt type unloading conveyor spaced from the cab delivering end of the main high speed conveyor, and accelerating and decelerating live roll speed adjusting conveyors positioned between the respective low speed conveyors and the high speed conveyor. Moving loading and unloading platforms, comprising endless belt type conveyors, are positioned adjacent and alongside the respective low speed conveyors. The ends of the two sets of conveyors are positioned adjacent each other between unloading and loading stations at each end of the circuit, and after the passengers have unloaded from the cabs at the unloading stations, the cabs are transferred from one set of conveyors to the other by transfer devices including cab conveying means. A sufficient number of passenger cabs is conveyed by the series of conveyors forming the circuit to insure that a number of cabs are always passing by the loading and unloading stations and to insure that the automatic timed sequence of dispatch and travel of the cabs is maintained.

One of the novel features of the apparatus to be described in the present application is the manner of obtaining and preserving timed sequence of dispatch and travel of the cabs. In the apparatus and method herein-described, the passenger cabs move past the loading station of each side of the circuit as described above with adjacent cabs in contact with each other. The cabs are separated as they are conveyed to the high speed conveyors, and travel in substantial spaced apart relationship while resting on the high speed conveyors, which deliver them to the decelerating conveyors where they are again bunched as they approach the unloading conveyors. The cabs are bunched together as they pass onto and are conveyed by the unloading conveyors, but are spaced far enough apart so that they will not run into each other as they are respectively received on the unloading conveyors. After the cabs pass by the unloading stations on each side of the circuit, they are again separated and turned at high speed to the other side of the circuit. The cabs are then bunched until they are brought into contact with each other, to reposition or respace them, thereby preserving their time sequence of travel, and they pass onto the loading conveyors in contact with each other.

From the foregoing, it will be appreciated that our system provides substantial advantages over prior practices. In the first place, the system insures that empty cabs are always available for loading when prospective passengers approach the loading platform. This feature of the invention eliminates waiting and consequent platform congestion during rush hours. Another important advantage of the invention is that passengers load and unload with the same ease that one steps onto or off of a conventional escalator. The only points in the system where the passenger must himself effect a speed adjustment or negotiate a speed increment in transferring between elements of the system are at the receiving and delivering ends of the moving loading and unloading platforms, respectively, where he steps between a stationary surface and a belt conveyor, and vice versa. All other speed adjustments are effected automatically by the apparatus, with maximum standards of safety and comfort being maintained. Our invention thus provides apparatus which prospective passengers board and leave with complete confidence and safety.

Other important advantages are that the continuous loading, high speed transportation and unloading features of the invention provide for mass transportation on a heretofore unknown scale, the ride taken by the passenger is swift, silent and comfortable, the possibility of falling in front of one of the cabs or coming into contact with dangerous electrical elements or the like is eliminated, the conveyors employed to form the endless circuit are of the most reliable types known in the art, and no attendants corresponding to train crews are required.

Other objects, uses and advantages will be obvious or become apparent from a consideration of the following description and the drawings.

In the drawings:

Figure 1 diagrammatically illustrates an embodiment of the invention designed to replace the shuttle subway between Times Square and Grand Central Station in New York City, New York;

Figure 2 is a view similar to Figure 1, illustrating the positioning of the passenger cabs as they are conveyed by the respective conveyors;

Figures 3A and 3B taken together are an enlarged plan view of the right end of the apparatus shown in Figure 1, partially in section and with parts broken away for clarity of illustration;

Figure 4 is a perspective view of the portion of the apparatus shown in Figures 3A and 3B, looking toward the loading side of the apparatus;

Figure 5 is a perspective view of the same portion of the apparatus shown in Figure 4, looking at the unloading side thereof;

Figures 6 and 7 are similar to Figures 4 and 5, respectively, showing passengers entering and leaving the system;

Figure 8 is a plan view of the left hand end of the apparatus shown in Figure 1, with parts broken away, showing only the conveying elements and associated structure comprising the transporting apparatus;

Figure 9 is a plan view similar to that of Figure 8 illustrating the transporting elements providing the left hand curve of Figure 1 and adjacent transporting elements;

Figure 10 is a view similar to Figure 8 illustrating the right hand end of the apparatus shown in Figure 1 including the apparatus forming the right hand curve;

Figure 11 is a view similar to Figure 8 illustrating one pair of the high speed belts forming a part of each side of the illustrated circuit together with associated and related structures;

Figures 12A and 12B are composite, diagrammatic, side elevational views of the several conveyors forming one side of the apparatus shown in Figure 1;

Figure 13 is a diagrammatic side elevational view of an accelerating or speed adjusting conveyor;

Figure 14 is a sectional view along line 14—14 of Figure 3B;

Figure 15 is a sectional view along line 15—15 of Figure 2, on an enlarged scale;

Figure 16 is a sectional view along line 16—16 of Figure 2, on an enlarged scale;

Figure 17 is a sectional view along line 17—17 of Figure 2, on an enlarged scale;

Figure 18 is a plan view of a portion of the apparatus forming the curve shown in Figure 10;

Figure 19 is a sectional view of a preferred form of flexible coupling employed in said curve apparatus;

Figure 22 is a sectional view along line 22—22 of Figure 3B;

Figure 23 is a sectional view similar to that of Figure 17, but on an enlarged scale;

Figure 24 is a perspective view of one form of passenger cab that may be employed in connection with our invention;

Figure 25 is a bottom plan view thereof, with parts broken away;

Figure 26 is a sectional view of the cab along line 26—26 of Figure 24;

Figure 27 is a cross sectional view of the cab along line 27—27 of Figure 26;

Figure 28 is a diagrammatic plan view illustrating an intermediate station in accordance with the present invention;

Figure 29 is a diagrammatic plan view illustrating a combined loading and unloading station in accordance with the present invention;

Figure 30 is a diagrammatic plan view illustrating a modified form of the invention; and Figure 31 is a diagrammatic plan view illustrating a further form of the invention.

Figure 21:
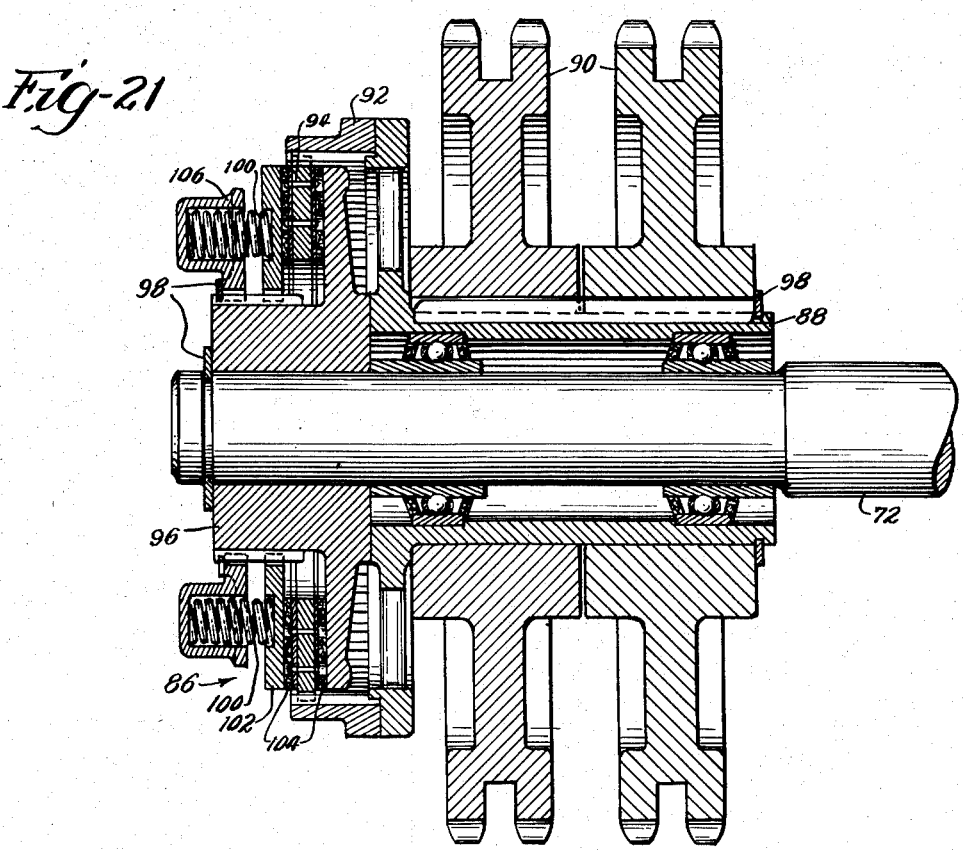
Figure 21 is a sectional view through the slip coupling employed with the apparatus shown in Figure 17.

But these drawings and the corresponding description are used for the purpose of disclosure only.

Referring now more particularly to Figures 1 and 2 of the drawings, reference numeral 10 generally indicates one form of apparatus provided in accordance with the teachings of the present invention and extending between a station 12, which may be Times Square Station at 42nd Street and Broadway in New York City, and a station 14, which may be Grand Central Station.

General description

The apparatus or machine for taking passengers between Times Square and Grand Central Station comprises a series of conveyors aligned in an endless circuit 16 forming a substantially continuous conveying surface for a plurality of continuously moving passenger cabs or cars 18 resting directly on and supported by the conveyors. The conveyors transport the passenger cabs or cars past and between the two stations, with an entrance or loading apparatus 20 and an exit or unloading apparatus 22 being provided at each station.

The apparatus 20 for loading the system comprises an auxiliary low speed loading conveyor 24 forming a part of said endless circuit 16 which conveys bunched cabs 18 in a continuous stream past the loading side of the stations and delivers the cabs to an accelerating conveyor 28. The accelerating conveyor 28 delivers the cabs in open order to the main high speed conveyor 30, which transports the loaded cabs at high speed over the major distance between the stations 12 and 14. The high speed conveyor 30 delivers the cabs to unloading apparatus 22 commencing with decelerating conveyor 32, which in turn delivers the cabs to a low speed auxiliary unloading conveyor 34. The low speed unloading conveyor 34 transports the cabs in a continuous stream past the unloading side of the station and delivers the cabs to an accelerating conveyor 36, which separates the cabs and delivers them to a transfer device or turnabout apparatus 40 for turning the cabs 18 about for delivery to the other side of circuit 16. The transfer device 40 delivers the cabs to decelerating conveyor 42 which decelerates the cabs and feeds them in a continuous stream to the loading conveyors 24.

The low speed conveyors 24 and 34, the accelerating conveyors 28 and 36, the decelerating conveyors 32 and 42, the turnabout apparatus 40 and the high speed conveyors 30 form the aforementioned endless circuit 16 about which the cabs 18 are continuously conveyed. The respective conveyors are positioned between spaced guide bars 45 (see Figures 3A, 3B, 14–17, and 23), the outer guide bar merging into curved guide bar 47 at the transfer devices 40. The cabs are provided with a guide roller 49 at each corner thereof for engagement with the guide bars as hereinafter more particularly described. The available space for the circuit may require that several curves be formed therein, other than at the ends thereof, as for instance, the curve shown in the high speed conveyors 30 at 44 and the curve shown in the speed adjusting conveyors 28 and 32 at 46 (see Figure 1). Apparatus for negotiating these curves is briefly described hereinafter. Adjacent each low speed loading conveyor 24 is positioned a moving loading platform 48, which moves at the same speed, or substantially the same speed, and in the same direction as the respective loading conveyors. Similar moving platforms 50 are positioned adjacent each low speed unloading conveyor 34.

Specific description

The high speed conveyors 30 extending over a substantial portion of the distance between the stations 12 and 14, comprise, in the illustrated embodiment, endless belt conveyors 52 and 54 of a known type and curved live roll conveyors 55 (see Figures 1, 9, 11, 12A and 12B). The belt conveyors are arranged somewhat as diagrammatically illustrated in composite Figure 12A. The belts 52 and 54 are preferably driven at a speed of approximately fifteen miles per hour by, for instance, motors 56 through gear reducers 58 of a known type and suitable couplings connecting these elements (see Figures 9 and 11). Interconnecting chain drives 60 may be employed where this is considered necessary.

The curved live roll conveyors 55 are interposed between the endless belts 52 and 54 on each side of the circuit to convey the cabs 18 along the curve indicated at 44 in Figure 1. The curved conveyors 55 comprise a plurality of rollers 61 each including a shaft 62 having a pair of rubber tired rolls 64 mounted thereon (see Figures 9 and 16). The shafts 62 are driven at substantially equal constant speeds through chains 66 which are powered by motors 56 and engage a shaft 62 at each end of the curved conveyor. The shafts 62 are preferably driven at a speed which conveys the cabs around the curve at the same speed that belts 52 and 54 convey them. The intervening shafts 62 are operatively connected through gear boxes 68 and couplings 70 in a manner described more completely hereinafter in connection with the description of the curved conveyor employed to negotiate the curve indicated at 46 in Figure 1. Preferably, idlers or idler rollers 63 are interposed between the driven shafts, with rubber tired rolls 65 thereof being keyed to their shafts 67. It will also be noted that the rollers 61 and 63 are staggered throughout the lengths of conveyors 55, as shown in Figure 9.

The accelerating and decelerating conveyors 28 and 32 are illustrated as live roll tables made up of a plurality of rollers 71 each including a shaft 72 having a pair of rubber tired rolls 74 keyed thereto (see Figure 23), with the rolls of alternate shafts being staggered, as shown more particularly in Figures 3A, 8 and 10. As indicated in Figures 9, 10, and 11, the conveyors 28 and 32 at the left hand end of the circuit 16 may be driven through chains 76 powered by motors 56, the shafts of each conveyor being interconnected by staggered chains 78, with the exception of the three rollers indicated at 80 at the receiving ends of the accelerating conveyors (see Figures 8 and 10) and the two rollers indicated at 82 at the receiving ends of the decelerating conveyors (see Figures 9 and 11), which preferably are idler rollers. The rolls 74 of these latter rollers are preferably keyed to their rotatably mounted non-driven shafts 72. The driven rollers are driven through slip couplings at progressively higher or lower speeds, such as indicated by the exemplary numerals on Figure 13 illustrating an accelerating conveyor.

A typical slip coupling which may be employed is illustrated in Figures 17, 21 and 23, wherein a shaft 72 is shown rotatably mounted in bearings 84. Outwardly of one of the bearings the shaft 72 carries fixed thereto a friction type coupling generally indicated at 86 which may comprise a rotatably mounted tubular member 88 (see Figure 21), to which the double chain sprockets 90 are keyed, and which has fixed thereto a ring gear like member 92. Member 92 meshes with perforated disc 94 through which is received hub 96 that is keyed to shaft 72. Springs 100 held in place by plate 106 urge disc 102 toward disc 94, friction discs 104 being secured on either side of disc 94 to provide the desired frictional coupling. Hub 96, sprockets 90, and plate 106 may be secured from axial movement by lock rings 98. The chains 78 are trained over hub sprockets 90, the progressive reduction or increase of speed of the rollers being obtained by the well known mechanical expedient of varying the diameter and number of teeth in adjacent sprockets 90.

It will be noted that the amount of torque transmitted by the coupling to the shaft 72 does not depend on the weight of the load placed on the rollers 71, but only on the force employed against the friction discs 104.

The above described coupling 86 is exemplary only of the types of couplings which may be employed. However, whatever specific form of coupling is used, it is essential that a given maximum amount of torque be constantly available on each driven shaft 72 for transmitting propelling energy to the cab moving over the conveyor. In other words, the objective is to prevent any slippage between the rollers 71 and the cabs 18, irrespective of the combined weight of the individual cabs and passengers carried thereby. To accomplish this, each of the shafts 72 is driven through a type of coupling, such as coupling 86, which is of a type that will transmit a given maximum torque before slippage takes place. This maximum torque is constantly available, but is selected at a value which is less than the torque required to produce slippage between the object transported on the conveyor and the rollers 71. Couplings of this type, which may be termed "constant torque devices" are illustrated in our Patent No. 2,701,049, granted February 1, 1955.

The reason for providing couplings of this type is that if each roller 71 had an invariable rim speed, it would be evident that with a cab riding on several rollers 71 at once (as shown, for instance, in Figure 13) there would have to be slipping between the rolls 74 and the bottom of the cab. This is undesirable because of the resulting noise, wear and rough action. We therefore prefer to provide means which confines the slipping to the couplings.

The accelerating and decelerating conveyors 28 and 32 at the right hand end of circuit 16 (see Figures 10 and 11) are similar in nature to those already described, and are powered by similar motors 56 through chains 76 at the ends of the conveyor belts 54 (see Figure 11). These conveyors 28 and 32 are located at the curve indicated at 46 in Figure 1, however, and curved conveyors 85 are interposed on each side of the circuit to convey the cabs 18 around said curve.

Curved conveyors 85 (see Figure 10) are similar to conveyors 55 and comprise a plurality of rollers 61 each comprising a shaft 62 having a pair of rubber tired rolls 64 fixed thereto. The shafts 62 of conveyors 85 are driven through chains 87 connecting them to the shafts 72 of the adjacent accelerating and decelerating conveyors 28 and 32. The intervening driven shafts are operatively connected through gear boxes 68 and couplings 70 similar or equivalent to those diagrammatically illustrated in Figures 18 and 19. As shown in Figure 18, the first driven roller shaft 62 of the curved conveyor 85 interposed in the accelerating conveyor 28 is driven by chains 87, which shaft is connected through a conventional coupling 91 to a short shaft 93 rotatably mounted in end gear box 68. Shaft 93 has keyed thereto a mitre gear 95 which meshes with mitre gear 97 keyed to shaft 99 also rotatably mounted in end gear box 68. A shaft 101 is interposed between the first and second gear boxes 68 and flexible couplings 70 connect the ends of this shaft with shaft 99 and shaft 103 of the second gear box. The shaft 103 extends through the second gear box 68, it being rotatably mounted therein, and actuates the next powered shaft 62 (short shaft 62a in the illustrated embodiment) through a mitre gear 105 which meshes with rotatably mounted mitre gear 107 fixed to the end of this shaft 62 through a conventional coupling 91. The succeeding shafts 62 are actuated in the same manner, with the end gear boxes 68 being connected to the subsequent speed adjusting conveyors by chains 109. A coupling 70 is diagrammatically illustrated in Figure 19 wherein ring gears 111 and 113 secured together as by bolts 115 receive hub gears 117 and 119, respectively, which are in turn keyed to the shafts that they connect.

Figure 20:
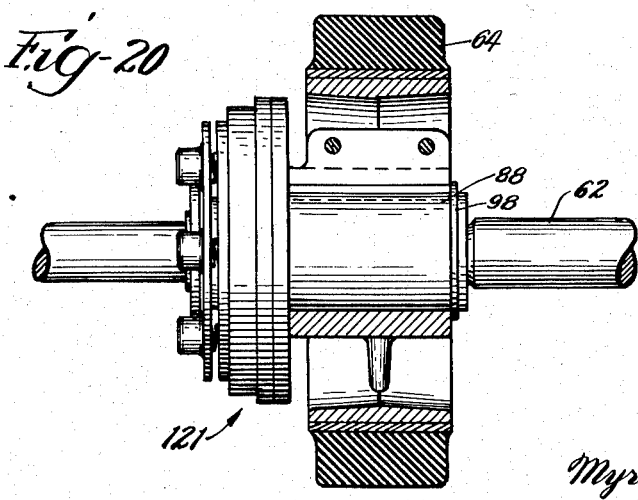
Figure 20 is a plan view, partially in section, of a driving roller employed in said curve apparatus.

Since curve 46 is relatively sharp, the inside roll on each side of a curve 46 is driven through a slip coupling 121 (see Figure 20) similar to couplings 86 of Figure 21, except that the rubber tired roll 64 is keyed to member 88 rather than sprockets 90. Thus, as cabs proceed around the curve, the outer rolls run at a fixed constant speed while the inner rolls are permitted to slip under the restraining action of the inner sides of the cabs (with respect to the curve) which tend to move slower than the outer sides. This eliminates the possibility of slippage between the individual rolls and the cabs, and makes for a smooth, quiet ride over the curved conveyors.

In the illustrated curves 85, the first and last driven shafts 62 are parallel to the shafts 72 of the adjacent accelerating and decelerating conveyors, and the shafts 62 of all the rollers forming the curved conveyors 85 are located on radii extending from the center from which curve 46 is struck. Preferably the distance between the first and last driven shaft 62 of curved conveyors 85 and the next adjacent shafts 72 of conveyors 28 and 32 is equal to one half the length of a passenger cab 18 in the direction of travel, and the distance between the rolls 64 of the first mentioned shafts and the respective rolls of the next adjacent shafts 62 are also equal to one half the length of a passenger cab. The rolls of the last mentioned shafts, indicated at 64a in Figures 10 and 18, are mounted on short shafts 62a positioned on radii extending from the center of curve 46.

According to this arrangement, as a cab proceeds, for instance, from the right hand portion of conveyor 28 of Figure 10 toward the curve 85, it starts to turn just as the center thereof passes over the end shaft 62 of curve 85. This is because the leading edge of the cab engages both the rolls 64a at the same time that the center of the cab passes over the end shaft 62 and the trailing edge of the cab leaves the rolls 74 of end shaft 72 of conveyor 28. This makes for smooth transition between rectilinear and curvilinear motion, and vice versa. As the cab thereupon changes from rectilinear movement to curvilinear movement, it is desirable to interpose couplings 121 between both of the rolls 64 in this end shaft 62, since both the rolls 64 would tend to be moved at different speeds by the cab as it passes over them, which otherwise would result in noise, wear, and rough action. Similar remarks apply to the other end shafts 62 of curves 85.

In the illustrated embodiment, only one roll 64a of each set of rolls 64a is shown as driven, though both rolls 64a could be powered if the roll 64a here illustrated as powered was driven through a coupling 86.

Suitable idler rollers 133 may be positioned between the rollers 61 where indicated in Figure 10 and casters 135 and 137 are employed to support the cabs when they are lopsidedly loaded, to insure against possible upset as the motion of the cabs changes from rectilinear to curvilinear and vice versa.

The low speed loading and unloading conveyors 24 and 34 are of the endless belt type arranged as diagrammatically illustrated in Figures 12A and 12B. They may be driven by motors 110 (see Figures 8 and 10) through a conventional gear reducer 112 and suitable couplings. Preferably chains 114 connect the most closely adjacent driven shafts 72 of accelerating and decelerating conveyors 28 and 32 with the pulleys driving the conveyors 24 and 34, respectively.

The moving loading and unloading platforms 48 and 50 are also of the endless belt conveyor type, driven by conventional motors 116 through suitable gear reducers 118, and are similar in nature to conventional escalators, except that it is contemplated that ordinarily they will be substantially horizontally disposed. Moving hand rails may be provided, as is customary with escalators, if so desired; however, as shown in Figure 14, stationary hand rails 120 are employed in the illustrated embodiment. The loading and unloading platforms move at the same speed, or at substantially the same speed, as the low speed conveyors which they are positioned adjacent to.

The accelerating conveyors 36 (see Figures 3B, 8 and 10) are similar in nature to the accelerating conveyors 28. In the illustrated embodiment, conveyors 36 each comprise two rollers 71 each including a shaft 72 having mounted thereon two rubber tired rolls 74. Said shafts 72 are driven through slip couplings 86 by chains 124 actuated by one of the pulleys over which the low speed unloading conveyors are trained. The two shafts 72 are interconnected by the double chains 126 and run at stepped speeds. As in the case of the other accelerating conveyors, the three idler rollers 80 are positioned between the end of the unloading conveyors 34 and the shafts 72.

The transfer devices or turnabout apparatus 40 which receive the cabs 18 from the accelerating conveyors 36 are similar in nature to the transfer devices described in our aforementioned application Serial No. 369,036. The transfer devices 40 generally comprise two series of rollers 128 and 130 power driven at different speeds by suitable motors 129. The rollers 128 and 130 have their axes on radii extending from the center of the turnabout, and their speeds are in proportion to their distances from that center. The speeds of rollers 128 and 130 are such that as the respective cabs are conveyed about the curve defined by these rollers, the speed of the center of the cab remains substantially constant. The rollers 128 and 130 are positioned between outer guide bar 47 (see Figures 3B and 22), which is curved on an arc struck from the center of the transfer device and merges into the outer guide bars 45, and an idler wheel 132 rotatable about said center. As shown in Figure 3B, the outer curved guide bar 47 extends over an arc which is somewhat greater than 180 degrees for a purpose hereinafter made clear. These guides insure that the cabs will follow the intended curve as they pass through the transfer device 40. The periphery of said idler wheel 132 provides a continuation or projection of the inner guide bars 45 since it forms a continuation of the guiding surface provided by said inner guide bars, as will be made clear hereinafter, though the wheel 132 has additional functions.

Idler rollers 134 and casters 136 and 138 are preferably positioned at the receiving and delivering ends of the transfer device, with the casters 136 preferably being urged into the respective positions shown in Figures 3B, 8 and 10, wherein they are aligned with the direction of movement of the conveyor from which they receive, but are free to pivot in the direction of the arrows of Figure 3B to follow the movement of each cab as it passes into and from the transfer deivce 40. Such biasing means is diagrammatically illustrated in Figure 3B and may comprise, for instance, a compression spring 140 interposed between a caster 136 and a fixed base 142, with a suitable stop 143 being employed to correctly position the casters 136 when the springs 140 are effective to move them.

The idlers 134 and casters 136 and 138 are employed to provide smooth transition from rectilinear movement to curvilinear movement, and vice versa, as cabs 18 enter and leave the turnabout apparatus 40. As shown in Figures 3B, 8 and 10, the idlers 134 are rotatable about the same axis, which axis is parallel to the axes of the rollers forming conveyors 36 and 42, and which passes through the center of the turnabout device. Preferably the spacing between the last accelerating roller of conveyors 36 and both of the first rollers 128 and 130 of devices 40 is equal to the length of the individual cabs, and the idlers 134 are positioned half way between. The last rollers 128 and 130 of devices 40 and the first roller of decelerating conveyors 42 are spaced in a similar manner. The action of the cabs passing over these elements is similar to that mentioned with respect to curved conveyors 85, as will be made clear hereinafter.

The decelerating conveyor 42 receives the cabs 18 from the transfer device and delivers them to the loading conveyors 24. The decelerating conveyors 42 of the illustrated embodiment comprise a plurality of rollers 71 each including a shaft 72 having a pair of rubber tired rolls 74 mounted thereon, which rollers are driven in stepped speeds through chains 142 operatively connected to one of the loading conveyor belt pulleys. Said shafts are interconnected by chains 144 and are each driven through slip couplings 86. In the illustrated embodiment, a pair of idler rollers 146 are positioned between the last decelerating rollers 71 and the receiving end of the loading conveyors 24 and preferably these idlers are constructed in the same manner as those indicated at 80 and 82 in Figures 8 and 10.

The elements forming the conveyors described are illustrated in sectional views of Figures 14–17, 22 and 23 as mounted on suitable supports erected in two of the four adjacent existing subway passageways extending between Times Square and Grand Central Station. As shown in Figure 14, the pulleys and idlers over which the loading conveyors 24 and moving platforms 48 are trained are journalled in suitable bearings 150 mounted on diagrammatically illustrated supports 152 erected at the loading end of each passageway, with the guide rails 45 fixed to said supports somewhat as shown. The stationary hand rail 120 is fixed to side supports 153, and comprises a frame work enclosed in an imperforate cover 154. The lower inner edge 156 of the cover 154 is preferably in substantial wiping engagement with the passenger support tread of moving platform 48. Conveyor 34 and moving platform 50 are similarly arranged.

The high speed belts 52 and 54, the curved conveyors 55 and 85, and the accelerating and decelerating conveyors 28 and 32 may be mounted on suitable supports erected inside these passageways, generally indicated at 158 in Figures 15–17 and 23, to which the guide rails 45 are secured on either side of the conveyors. As indicated in Figure 17, protective housings 160 and 161 may be fixed around the slip couplings 86 and chain sprockets 90, said housings being secured in any suitable manner to the supports 158. A platform 163 may be provided for easy inspection of couplings 86. The conveyors 36 and 42 may be supported on similar supports (not shown) erected at the ends of conveyors 24 and 34, respectively, with the guide rails 45 and protective housings 160 secured somewhat as shown in Figure 17. The rollers 128 and 130 of the turnabout devices 40 and the motors 129 therefor may be mounted on suitable supports 162 (see Figure 22) resting on fixed surface 164, or in any other suitable manner, with the outer curved guide bar 47 fixed to support 166 by plate 168 somewhat as shown or as desired. Preferably a walkway is provided along the outer sides of the accelerating and decelerating conveyors 28 and 32, the curved conveyors 55 and 85 and the high speed belts 52 and 54 comprising a platform 170 and handrail 172 secured in any suitable manner to the supports 158 and 173. A similar walkway is provided around the periphery of each turnabout device 40 (plate 168 provides the walkway in the illustrated embodiment) and the space between the ends of each turnabout device and the conveyors 24 and 34, along the sides of the conveyors 36 and 42 is kept free of obstructions, as shown in Figure 3B. Swinging doors 174 may be mounted at the ends of the turnabout devices and the ends of the subway passages across the walkway where shown in the drawings.

The cabs 18 generally comprise quadrilateral bodies 180 (see Figure 24), which, in the illustrated embodiments, are square in horizontal cross-section. Figures 24–27 illustrate one form of cab including a floor 182, sidewalls 184 formed with windows 186, an imperforate rear wall 188, a front wall 190 formed with a doorway 192 and a ceiling or roof 193 which may be open at the center and have a grating or the like 194 secured in said opening. The interior of the individual cabs may be provided with suitable seats 195 and commuter straps or handles 197 commonly seen in subway vehicles, street cars and the like. Handles 197 are shown biased outwardly of the center of the cab to raise them out of the way when not needed, a common feature in modern street cars and the like.

As already mentioned, a generally horizontal guide roller 49 rotatable about a vertical axis is mounted at each corner of the cab, and as shown in various figures of the drawings, the guide rollers engage the guide bars 45 or 47 between which the various conveyors are disposed. The lower portion of each cab bottom or floor is flat, and it should be noted that the cab bottoms or floors are the only portions of the cabs that engage the various conveyors. As shown more particularly in Figure 25, the guide rollers protrude beyond the sides of the cab somewhat; the rollers adjacent the rear of the cab are positioned so that the periphery thereof is substantially aligned with the outside surface of the rear wall, while the rollers adjacent the front of the cab, or below the doorway 192, are disposed somewhat inwardly of the front wall. The front wall and the doorway of the cab therefore overhang the moving platforms 48 and 50 as the cabs are conveyed past them, as shown in Figure 14.

The cabs may be provided with suitable doors, for instance doors 196, which are preferably automatically opened and closed by suitable means in the manner hereinafter described.

The operation of the various conveyors may be interlocked by the chain drive means illustrated in the drawings, and the drive of the high speed or more powerful conveyors 52 and 54 may be transmitted in part to the speed adjusting conveyors 24 and 28 through slip couplings 200 similar to couplings 86. Similar couplings 202 may be interposed between said conveyors 52 and 54 and curved conveyor 55 (see Figures 9 and 11). We prefer to interpose a 1 to 1 gear box 204 between the conveyors 54, where shown in Figure 11, pulleys 206 thereof (see Figure 12A) being connected to the gear box through conventional coupling 208 and slip coupling 210, similar in nature to coupling 86. Additionally, suitable brakes 212 may be associated with motors 56 for aiding in stopping all the various conveyors at the same time.

*Operation*

We prefer to operate the loading conveyors 24 and their moving platforms 48, and the unloading conveyors 34 and their moving platforms 50 at approximately one and one half miles per hour, which is about one-half walking speed. In actual practice, the loading conveyors and the moving loading platforms move at approximately 132 feet per minute, and the unloading conveyors and moving unloading platforms move at a speed of approximately 137 feet per minute. The high speed conveyors 52 and 54 preferably operate at fifteen miles per hour. The rollers of accelerating and decelerating conveyors 28 and 32 operate at stepped speeds which will smoothly adjust the speeds of the cabs between that of the respective low speed conveyors and that of the high speed conveyors. The rollers of curved conveyors 55 and 85 operate at approximately equal speeds related to the speeds of the conveyors between which they are interposed. The rollers of accelerating conveyors 36 operate at stepped increasing speeds to separate the cabs sufficiently, before they enter the transfer devices 40, to avoid any interference between the cabs as they are turned about before being delivered to the other side of the circuit 16. The rollers 128 and 130 in the transfer device operate at speeds proportional to their distances from the center of the transfer device, and at sufficiently high speeds to maintain the speed each cab travels at as it enters the transfer device. The rollers of decelerating conveyors 42 operate at stepped decreasing speeds which will slow the cabs down sufficiently so that adjacent cabs will come into contact with each other and maintain such contact, as they pass onto the loading conveyors. Since the rollers 49 of the cabs 18 project outwardly of the sides of the cabs, it is the rollers of adjacent cabs that come into contact in the present embodiment.

Since our system is so arranged that the spacing between adjacent passenger cabs and the speeds thereof are controlled solely by the conveyors on which they rest, it has been found desirable to operate the system in such a manner that the cabs travel about the circuit 16 in timed sequence of travel, to avoid bumping of loaded passenger cabs and other difficulties. To do this, it is necessary to periodically respace or retime the cabs for the reason that half full or empty cabs will accelerate and decelerate at different rates of speed. While the acceleration and deceleration rates of fully loaded cabs as compared with the accelerating and decelerating rates of half full or empty cabs tend to substantially compensate each other, there will exist a slight variation which is impractical to eliminate by attempting to mechanically control these rates of acceleration and deceleration. Respacing also compensates for malfunctioning of one or more of the conveyors.

We have found that the timed sequence of travel of the cabs about the circuit 16 may be established and maintained by bringing adjacent cabs into contact at some point in the system, so as to respace or reposition the cabs with respect to each other and then dispatching the cabs at equal intervals one at a time from this point. In the illustrated embodiments of the invention, we bring adjacent cabs together just before they pass onto the loading conveyors 24, so that they will be conveyed past the loading stations in contact with each other, and dispatched from the loading stations at equal intervals. The cabs are therefore repositioned or respaced with respect to each other and to the loading conveyors just prior to their entry upon the loading conveyors, and are transferred to the loading conveyors in a manner to make the next trip to the other end of the circuit in substantially the same timed sequence in which all previous trips were made.

We have found that, in a system of the type herein described, with a circuit of fixed length, and the conveyors thereof, particularly the low speed conveyors, running at given speeds of operation, there is a theoretical number of cabs which, if employed in the system, will fill the system so that adjacent cabs come into contact as the trailing edge of a leading cab passes over the center line of the low speed conveyor end pully at the cab receiving end thereof. By adding one or more cabs, adjacent cabs will come in contact before passing over this pulley; by removing one or more cabs, adjacent cabs will be spaced from each other even at their lowest speed of travel.

Also, for any system of this type employing a circuit of fixed length and a given number of passenger cabs, the speeds of the conveyors comprising the circuit can be so calculated and arranged that adjacent cabs will come into contact as the trailing edge of a leading cab passes over the center line of the lowest speed conveyor end pulley at the cab receiving end thereof. In other words, the given number of cabs will then just fill the system. By adding one or more cabs, the adjacent cabs will come into contact before being slowed to the minimum speed; by removing one or more cabs, adjacent cabs will not come into contact with each other even at their low speed of operation. Also, by increasing the speeds of any or all of the conveyors, other than the lowest speed conveyor adjacent cabs will come into contact before passing over this pulley. By decreasing the speeds, adjacent cabs will be spaced from each other even at their lowest speeds of travel.

We have also found that in a system of the type described having a given number of cabs and comprising conveyors all running at given speeds, a theoretical system length may be calculated wherein the given number of cabs will just fill the system whereby the cabs come into contact as the trailing edge of a leading cab passes over the center line of the low speed conveyor end pulley at the cab receiving end thereof. By decreasing the length of any or all conveyors comprising the system, adjacent cabs will come into contact before passing over this pulley. By increasing the length of any or all conveyors comprising the system, the cabs will be spaced from each other even at their lowest speeds of travel.

It will thus be seen that the bringing of adjacent cabs into contact for respacing is controlled by three variables, namely, the number of cabs in the system, the speed of operation of the conveyors, and the length of the system. These variables may be varied singly or in combination to obtain the result desired. It may be added that the reference point used in the above discussion, namely, the center line of the loading or low speed conveyor and pulley at the receiving end thereof, has been used for descriptive purposes only and is not to be understood to preclude the use of other than belt conveyors for loading or low speed conveyors in the system.

In the illustrated embodiments of the invention, the apparatus length was substantially fixed by space limitations, and the speeds of the conveyors were substantially limited for the reasons discussed immediately below. We were therefore substantially limited to the type of system first discussed above in laying out apparatus 10.

It has been found that the success of passenger transportation systems depends largely on the manner in which the passengers are loaded and unloaded and how fast the system may operate with maximum safety to passengers boarding and leaving same. Transportation apparatus, to reach the optimum of efficiency, must be so arranged that prospective passengers may board and leave the apparatus with ease and confidence, and yet the system must be capable of keeping passenger ramps cleared even during rush hours.

Experience has demonstrated that passengers may safely board a moving sidewalk from a stationary loading platform or ramp, or vice versa, or step from a slowly moving conveyor to a high speed conveyor, or vice versa, when the passenger transfers from one to the other in the direction of travel of the conveyor or conveyors and the differential in speed of the elements comprising the apparatus does not exceed one and one half miles per hour.

It is therefore desirable to operate the moving loading platforms 48 and 50 at approximately one and one half miles per hour, and since the low speed conveyors must move at the same speed, or substantially the same speed, as the moving platforms, so that the passengers can enter and leave the caps without having to step sidewise between two conveyors running at different speeds, the speed of the low speed conveyors must be at least approximately one and one half miles per hour. The high speed conveyors 30 may be operated at relatively high speeds limited by safety requirements and passenger comfort. A speed of fifteen miles per hour has proved eminently satisfactory. The speed adjusting conveyors must be operated at graduated speeds that will smoothly transfer the cabs between the high and low speed conveyors. The speeds of operation of transfer devices 40 should be such that the cabs are quickly and efficiently turned from one side of the circuit to the other side thereof. In the present embodiment, the speeds of operation of these devices are limited by the closely adjacent loading and unloading conveyors.

We therefore prefer to provide the circuit 16 with said theoretical number of cabs plus at least one additional cab so that when the cabs are traveling at the speed of the low speed conveyors, adjacent cabs will be in contact. In actual practice, the low speed loading conveyors 24 are operated at a speed which brings adjacent cabs into actual contact with each other but which is slightly less than the aforementioned speed increment and the low speed unloading conveyors 34 are operated at slightly higher speeds which closely approximate said desirable speed increment, so that the individual cabs 18 will be spaced somewhat from each other as they are received on the unloading conveyors, to avoid bumping when they carry passengers.

In the illustrated embodiment of the invention, we prefer to operate the individual rollers of decelerating conveyors 42 at gradually decreasing speeds, which, if the said theoretical number of cabs were employed in the system, would slow the individual cabs 18 down to the speed of the respective loading conveyors 24 and cause adjacent cabs to come into contact just as the trailing edge of the leading cab passes over the centerline of the loading conveyor end pulley at the receiving end of the respective loading conveyors.

However, since at least one more cab than said theoretical number of cabs has been added to the continuously moving stream of cabs, adjacent cabs are brought into contact before they pass onto the loading conveyors 24, and they tend to stack up in the areas of the system extending between the exit ends of the transfer devices 40 and the receiving ends of the loading conveyors 24.

It is to be understood, however, that the actual number of cabs carried by or operable on any one system is not of overriding importance. The important thing is that sufficient cabs be employed on the circuit to insure that, as each cab passes onto the loading conveyors, the next succeeding cab is forced against it, either by further succeeding cabs, or by decreasing the rate of deceleration of conveyors 42.

Passengers enter the system, for instance, at Grand Central Station in Figures 4 and 6, by stepping onto the moving loading platform 48 in much the same manner that one would board a conventional escalator. Passenger movement onto the platform 48 may be guided and controlled by suitable railing or the like diagrammatically illustrated at 219 in Figure 3B. Selecting a cab 18 from the continuous stream of cabs passing by the loading station, the passenger enters it and takes a seat, or if the cab is provided with overhead hand grips, grasps one of these. Since the cabs and the loading platform move at the same speed, there is no confusion and passengers may readily step from the moving platform 48 to the individual cabs. Passengers overly hesitant in entering a cab 18, or desiring not to do so, are carried to the other end of the moving loading platform 48, where they may step off the moving platform in much the same way one would leave an escalator and leave by exit 221. The loading platforms are kept open at both ends for this purpose. As the cabs pass by the loading station in contact with each other and are stationary with respect to each other and the individual passengers, it is impossible for a passenger to become caught or wedged between two cabs or to wander out on the loading conveyor. As indicated in Figures 4 and 6, if doors 196 are employed, preferably they automatically open as the cabs pass by the passenger receiving end of the platforms 48, and automatically close as they pass by the other end of the platform. The walkway about the apparatus, which in practice is about two feet wide, and the swinging doors 174, insure that even if a passenger becomes caught in a cab door, injury is unlikely since the doors swing easily when pushed and there is nothing in the walkway for a passenger to be jammed against.

The cabs leave the loading conveyor 24 at Grand Central Station and are smoothly brought up to the speed of the high speed conveyors 52, 54 and 55 by the accelerating conveyor 28, at the same time separating from each other. The cabs are conveyed in open order over the respective high speed conveyors to the decelerating conveyor 32, which smoothly brings the speed of the cabs down to the speed of the unloading conveyor 34. While passing over the curve 85 in the decelerating conveyor, the cabs travel at constant speed since the rollers of this conveyor all run at substantially equal speeds. The cabs are bunched while passing over the decelerating conveyor 32, but, rather than being brought into contact with each other, they are bunched only enough so that there will be some space (approximately three inches in the illustrated embodiment) between adjacent cabs as they are received and conveyed by the unloading conveyor, to avoid bumping of the cabs while they contain passengers. This slight but adequate spacing is provided, as already mentioned, by running the unloading conveyors 34 at a slightly higher speed than the loading conveyors 24, for instance, the speeds mentioned above. In the illustrated apparatus, the passengers will then step from the cabs to the unloading conveyor 50 at Times Square and will step from the unloading conveyor 50 in the same manner they would from an escalator. The cabs 18 after leaving the unloading conveyor pass onto the accelerating conveyor 36 where they are accelerated and separated for turning about at high speed. The rollers of the accelerating conveyor 36 and the transfer device 40 are so arranged, as described above, that as the leading edge of a cab engages the turnabout rollers, the trailing edge leaves the last accelerating roller and at the same time the guide rollers 49 on the side of the cab adjacent the curved guide rail 47 engage it and the rotatable wheel 132 engages the center of the other side of the cab. This relationship of these elements is shown in Figure 3B where the cab 18a is at the point where it changes from rectilinear movement to curvilinear movement. In this position the center of the cab is over idlers 134. As already mentioned, the guide rail 47 is curved beyond 180 degrees, since the individual cabs will start to swing counterclockwise, when in the position of cab 18a of Figure 3B, before the rear guide wheels 49 pass by the axis about which idler wheels 134 rotate.

The transfer device 40 thus provides three point positioning, which insures that each cab will be smoothly conveyed over the transfer device by the rollers 128 and 130. At the exit end of the transfer device 40, the rollers of said device and the decelerating conveyor are arranged so that as the leading edge of the cab engages the first decelerating roller, the trailing edge of the cab leaves the last transfer device rollers, and at the same time, the guide roller 49 on the leading corner of the cab adjacent the inside guide rail 45 engages said guide rail and the wheel 132 is disengaged from the other side of the cab. As the individual cabs proceed over the decelerating conveyor, they run into the cab or cabs stacked up ahead of them, thus repositioning or respacing themselves for the run on the other side of the circuit, and then are received on the loading conveyor 24 on the other side of the circuit, with adjacent cabs in contact with each other, for reloading at Times Square as before.

Preferably the first roller of each accelerating conveyor (that is, conveyors 28 and 36) is positioned from the end of the next preceding conveyor a distance equal to the length of the individual cabs 18 in the direction of travel. That is, as the trailing edge of the individual cabs 18 leaves the next preceding conveyor, the leading edge contacts the first roller of the respective accelerating conveyors. In the illustrated embodiments, three idler rollers support the individual cabs before the leading edge of each engages each said first accelerating roller. This makes for smooth starting of the acceleration steps. The idler rollers, being keyed to their shafts as described above, aid in keeping the cab moving in the direction it was delivered by the next preceding conveyor.

A similar relationship exists, as already mentioned, between the last accelerating roller of conveyors 36 and the first rollers 128 and 130 of transfer devices 40 as well as between the last rollers 128 and 130 of the transfer devices and the first roller in accelerating conveyor 42. This relationship makes for smooth passage of the cabs into and out of the transfer devices, since the individual cabs do not commence curvilinear movement before they have passed from the conveyors which convey them rectilinearly, and vice versa. Such an arrangement eliminates rough action and jarring change of movement. This relationship also obtains in curved conveyors 85. The fact that the casters 136 between the respective conveyors 36 and 42 and the respective ends of the transfer devices 40 are free to pivot as the individual cabs enter or leave the transfer device, and are biased to return to original position in alignment with the preceding conveyor, prevents the casters 136 from being misaligned with respect to the respective cabs as the cabs engage them, thereby avoiding consequent interference with the smooth operation of the apparatus and unnecessary wear on the cabs. Casters 137 of curved conveyors 85 may be similarly biased, if so desired, with similar results, though in the illustrated embodiments the curve of these conveyors is too slight to warrent this.

The staggering of the rollers comprising the various live roll conveyors tends to spread the wear, occasioned by the action of the rollers, more evenly over the bottoms of the cabs.

In the embodiment of the invention described above, the circuit 16 measures approximately 2650 feet between the centers of the turnabout or transfer devices 40 and is provided with 123 passenger cabs 18 which make 226 round trips in twenty-four hours of continuous movement, each cab traveling approximately 230 miles during a twenty-four hour period. The system is arranged so that 18.3 cabs pass any one point on the system per minute. The loading capacity of the system is determined by the width of the loading platforms 48, and in the embodiment described above the system is capable of carrying 18,000 passengers per hour. The cabs 18 in practice are electrically lighted and heated for passenger comfort. They measure seven feet in length and width, with the guide rollers 49 projecting outwardly of each side about one inch.

*Modified forms of the invention*

While the foregoing apparatus does not include intermediate stations, it will be apparent that such stations may be provided, for instance, such as the intermediate station 220 of Figure 28. Cabs (not shown) are transferred from the high speed conveyor 222 to the decelerating conveyor 224, similar to decelerating conveyor 32 of Figure 1, which in turn delivers the cabs in spaced apart relationship to the low speed combined loading and unloading conveyor 226, similar to conveyors 24 and 34, whereupon passengers may leave the apparatus by stepping to the moving unloading platform 228, similar to unloading platforms 50, which delivers the passengers to stationary platform 230. The conveyor 226 carries the cabs past a moving loading platform 232, similar to moving platforms 48, passengers boarding same by stepping on at the left hand end thereof from platform 230 and then proceeding to a waiting cab as described above. The cabs are then transferred in series to the accelerating conveyor 234, similar to accelerating conveyors 28, which conveys them to the next high speed conveyor. Preferably a partition 236 carrying swinging door 237, similar to doors 174, separates the two moving platforms 228 and 232, and appropriate "entrance" and "exit" signs are employed. Alternately, the moving platforms 228 and 232 may be replaced by a single moving platform substantially equal in length to conveyor 226, and the stationary platform 230 may be of a type that overhangs the long moving platform.

Where intermediate stations are employed, it is desirable not to reposition the cabs, as above described, at the intermediate stations since some passengers may remain in the cabs for transportation to further stations along the circuit. However, it will be appreciated that by merely running the low speed conveyor 226 at a sufficiently low speed, the cabs may be brought into contact with each other for respacing and timed dispatch from this point.

Figure 29 diagrammatically illustrates an intermediate station 238 providing loading and unloading at the same low speed conveyor. Cabs proceed from the high speed conveyor 240, similar to conveyors 52 and 54, to the decelerating conveyor 242, similar to conveyors 32, and are received in series on the low speed conveyor 244, similar to the low speed loading and unloading conveyors 24 and 34. Passengers leaving the cabs may step to the moving unloading platform 246, similar to platforms 50, while passengers boarding the apparatus enter the cabs from the moving loading platform 248, similar to the platforms 48. The low speed conveyor 244 delivers the cabs in series to the accelerating conveyor 250, similar to conveyors 28, which in turn delivers the cabs to high speed conveyor 252. The cabs employed where this type of station is used should have a door on each side thereof, but otherwise would be similar to cabs 18. Alternatively, station 238 could be a station at which only unloading or loading takes place from both sides thereof.

While the illustrated embodiments of the invention transfer passengers between low speed moving platforms at spaced loading and unloading stations, it will be appreciated that the system herein disclosed could be used to transfer passengers from and to a high speed moving sidewalk or other type of high speed conveyor. Figure 30 diagrammatically illustrates this application of the invention, wherein the circuit 260, similar to circuit 16, is positioned between two high speed moving sidewalks 262 and 264 moving in different directions. The circuit includes low speed loading conveyors 266, similar to loading conveyors 24, moving loading platforms 268, similar to moving platforms 48, accelerating conveyors 270, similar to accelerating conveyors 28, high speed conveyors 272, similar to high speed conveyors 52 or 54, decelerating conveyors 274, similar to decelerating conveyors 32, low speed unloading conveyors 276, similar to low speed unloading conveyors 34, moving unloading platforms 278, similar to moving platforms 50, accelerating and decelerating conveyors 280 and 282, respectively, similar to accelerating and decelerating conveyors 36 and 42, and transfer devices 284, similar to transfer devices 40, though shown struck on a larger radius.

The respective conveyors illustrated diagrammatically in Figure 30 would be running at the same speeds that their referred to equivalent conveyors already described would normally run. The high speed moving sidewalks 262 and 264 could then run at the same speed that the high speed conveyors would run, namely, fifteen miles per hour. The cabs carried by the circuit 260 would be provided with a door at each side thereof. The relatively large wheels 285 of transfer devices 284, corresponding to idler wheels 132 of devices 40, could be driven at a sufficient speed whereby the peripheries thereof travel at the same speed as the inside portion or rear of the cabs travel as they are conveyed about the curves of the transfer devices, to prevent the inertia of wheels 285 from affecting the passage of the cabs through the transfer device.

Passengers desiring to board the high speed moving sidewalk 264 would step to the moving loading platform 268 adjacent it from an entrance within the circuit 260, and would enter a cab passing by the loading station on the loading conveyor 266 as described above. The cab carrying the passenger would pass from the loading conveyor 266, over the accelerating conveyor 270, to the high speed conveyor 272, in the same manner as described above. When the cab reached the high speed conveyor 272, it would be moving at the same speed as the moving sidewalk 264 so the passenger could transfer with ease from the cab to said moving sidewalk. Other passengers could at the same time enter the cab from the moving sidewalk, and be conveyed to the unloading station at the end of the circuit in the same manner as described above. Passengers would transfer to or from the high speed moving sidewalk 262 in the same manner.

In the embodiment of Figure 30, the apparatus comprising the circuit 260 could be the same as the apparatus forming the circuits described above (preferably, but not necessarily, without the curved conveyors), or apparatus similar to the circuits illustrated in our above referred to copending applications may be employed. However, the high speed conveyors 272 should be relatively long to allow passengers plenty of time to transfer between conveyors.

Diagrammatic Figure 31 illustrates that the system is not restricted to two sets of conveyors having the ends thereof positioned adjacent each other. Circuit 290 could be employed, for instance, in or on a subway or elevated structure around one or more city blocks, or around or through part of a relatively large metropolitan area such as the "Loop" in Chicago, Illinois. Circuit 290 may include low speed loading conveyors 292, similar to low speed loading conveyors 24, moving loading platforms 294, similar to moving loading platforms 48, accelerating conveyors 296, similar to accelerating conveyors 28, high speed conveyors 298, similar to high speed conveyors 52 or 54, decelerating conveyors 300, similar to decelerating conveyors 32, low speed unloading conveyors 302, similar to low speed unloading conveyors 34, moving unloading platforms 304, similar to unloading platforms 50, accelerating and decelerating conveyors 306 and 308, similar to accelerating and decelerating conveyors 36 and 42, and transfer or turnabout devices 310, similar to devices 40. A suitable number of cabs 18, having doors on each side thereof, could be employed on circuit 290.

Passengers could board the system by stepping to the loading platforms 294 and thence to cabs carried by conveyors 292. The cabs could be conveyed by accelerating conveyors 296 to the high speed conveyors 298 and thence to the decelerating conveyors 300 and low speed unloading conveyors 302 as before described, where passengers might unload by stepping to unloading platforms 304. Instead of unloading, however, they might ride through the transfer devices 310 and be conveyed to the stations 312 including moving platforms 314 in the shorter lengths of the illustrated circuit for unloading there. If desiring to ride to a station on the next long length of the circuit, the passengers would remain on the cabs and pass by the stations 312, be transported through the next device 310 and thence to the other side of the circuit. Of course, loading could also take place at stations 312, and alternately, a full set of conveyors similar to conveyors 292, 294, 296, 298, 300, 302, 304, 306, 308 and 310 may be substituted for stations 312.

It will be appreciated that the possible variations and embodiments of our system are numerous, and only a few have been illustrated to avoid undue prolixity.

The foregoing description and the drawings are given merely to explain and illustrate our invention, and the manner in which it may be performed, and the invention is not to be limited thereto, except insofar as the appended claims are so limited since those skilled in the art who have our disclosure before them will be able to make modifications and variations therein without departing from the scope of the invention.

We claim:

1. Passenger transportation apparatus of the type described comprising a low speed unloading belt conveyor and a low speed loading belt conveyor running in different directions, a plurality of cabs supported directly on and carried by said conveyors, an accelerating conveyor in series with the delivering end of said unloading conveyor, a decelerating conveyor in series with the receiving end of said loading conveyor, said accelerating and decelerating conveyors comprising live roll tables with the rolls thereof being driven through slip couplings, and turnabout means positioned between the delivering end of said accelerating conveyor and the receiving end of said decelerating conveyor for conveying cabs therebetween.

2. Passenger transportation apparatus of the type described comprising a series of conveyors aligned to form an endless circuit, a series of independent passenger cabs resting directly on said conveyors and normally traveling in spaced apart relationship about said circuit, said circuit including a low speed loading conveyor, a low speed unloading conveyor, and conveying means for transporting said cabs between said unloading conveyor and said loading conveyor, said conveying means including an accelerating conveyor receiving cabs from said unloading conveyor and a decelerating conveyor delivering cabs to said loading conveyor, and means for controlling the speed of said loading conveyor relative to said unloading, accelerating and decelerating conveyors as to bring adjacent cabs forcefully into contact with each other while being transported between said unloading conveyor and said loading conveyor, said cabs being sufficient in number to provide a continuous line of cabs in end to end contacting relation at said loading station.

3. Passenger transportation apparatus of the type described comprising a series of conveyors aligned to form an endless circuit, a series of independent passenger cabs normally traveling in spaced apart relationship about said circuit, said circuit including a low speed unloading conveyor, a low speed loading conveyor, and further conveyor means for transporting said cabs between said unloading and loading conveyors, and means for operating said further conveyors at such a speed relative to said loading conveyor as to bring adjacent cabs into contact with each other while being transported between said unloading and loading conveyors, and means to operate said loading conveyor at a speed to receive and maintain adjacent cabs in contact with each other as it receives and conveys them for dispatch at equal intervals at the delivering end thereof, said cabs being sufficient in number to provide a continuous line of cabs in end to end contacting relation at said loading station.

4. Passenger transportation apparatus of the type described comprising a series of conveyors aligned to form an endless circuit, a series of independent passenger cabs normally traveling in spaced apart relationship about said circuit, said circuit including a low speed unloading conveyor, a low speed loading conveyor, and further conveyor means for transporting said cabs between said unloading and loading conveyors, said further conveyors comprising an accelerating conveyor receiving from said unloading conveyor, and a decelerating conveyor delivering to said loading conveyor, said decelerating conveyor comprising a plurality of rollers driven through slip couplings, means for operating said decelerating conveyor at such a speed relative to said loading conveyor as to bring adjacent cabs into contact with each other as they are conveyed thereby, and means for operating said loading conveyor to receive and maintain adjacent cabs in contact with each other, said cabs being sufficient in number to provide a continuous line of cabs in end to end contacting relation at said loading station.

5. In passenger apparatus of the type described including two cab transporting conveyors running in different directions and having an end of one adjacent an end of the other, and at least one cab conveyed by the conveyors, the improvement comprising spaced guide means defining an arcuate path between the said ends of said two conveyors, said path being struck from a center equidistant between said ends of said two conveyors, conveying means for transporting the cab between said spaced guide means, with the distance between the ends of said conveying means and the respective ends of said two conveyors being substantially equal to the length of the cab in the direction of travel, and the ends of said conveying means and the respective ends of said two conveyors being equidistantly spaced from radii extending from said center and respectively perpendicular to the line of travel on said first mentioned conveyors, at least one idler roller positioned at each end of said guide means and rotatable about an axis located on the respective radii, and a resiliently biased caster positioned in advance of each of said idler rollers, said casters being biased to a position in alignment with the direction of movement of the next preceding conveyors.

6. In passenger transportation apparatus of the type described including two rectilinear cab transporting conveyors running in different directions and having an end of one adjacent an end of the other, and at least one cab conveyed by the conveyors including guide rollers on one side thereof, the improvement comprising an idler wheel positioned equidistantly between the adjacent ends of said conveyors, a guide bar concentrically curved about said idler wheel, conveying means for transporting the cab between said idler wheel and said guide bar, said guide rollers on said one side of the cab engaging said guide bar and said idler wheel engaging the other side of the cab to guide the movement of the cab as it passes between the idler wheel and the guide bar, with the distance between the ends of said conveying means and the respective ends of said two conveyors being substantially equal to the length of the cab in the direction of travel and the ends of said conveying means and the respective ends of said two conveyors being equidistantly spaced from radii extending from the center of said idler wheel and respectively perpendicular to the line of travel on said first mentioned conveyors, and means poistioned between said ends of said conveying means and the respective ends of said two conveyors adapted to support the respective cabs as they pass from one conveyor to another, said means comprising at least one idler roller positioned at each end of said conveying means and rotatable about an axis located on the respective radii, and a resiliently biased caster positioned in advance of each of said idler rollers, said casters being biased to a position in alignment with the direction of movement of the next preceding conveyors, the arrangement being such that the cab in passing from said one of said two conveyors onto said conveying means changes from rectilinear movement to curvilinear movement as the center thereof passes over the said radii perpendicular to said one of said two conveyors, and that the cab in passing from said conveying means to said other of said two conveyors changes from curvilinear movement to rectilinear movement as the center thereof passes over the said radii perpendicular to said other of said two conveyors.

7. In transportation apparatus, the combination of a plurality of groups of conveyors arranged in series relation and forming an endless circuit, a plurality of separate and independent cabs continuously traversing said circuit, two contiguous groups of conveyors each including a low speed loading conveyor, an accelerating conveyor, a decelerating conveyor, and a low speed unloading conveyor arranged in that order and with the low speed unloading conveyor of the first of said two contiguous groups delivering cabs to the loading conveyor of the second of said groups, and means for driving the unloading conveyor of said first group at a speed in excess of that for the adjacent loading conveyor of said second group, said cabs being sufficient in number to provide a continuous line of cabs in end to end contacting relation at said adjacent loading conveyor.

8. In transportation apparatus, the combination of a plurality of groups of conveyors arranged in series relation and forming an endless circuit, a plurality of separate and independent cabs continuously traversing said circuit, two contiguous groups of conveyors each including a low speed loading conveyor, an accelerating conveyor, a decelerating conveyor, and a low speed unloading conveyor arranged in that order and with the low speed unloading conveyor of the first of said two contiguous groups delivering cabs to the loading conveyor of the second of said groups, a further conveyor interposed between said adjacent unloading conveyor and loading conveyor, said further conveyor adjacent to and in continuous relation with said last-mentioned loading conveyor including a plurality of rollers driven through a slip coupling, and means for driving at least that portion of said further conveyor contiguous to said loading conveyor, at a speed slightly in excess of said loading conveyor, said cabs being sufficient in number to provide a continuous line of cabs in end to end contacting relation at said last-mentioned loading conveyor.

9. In transportation apparatus, the combination of a plurality of groups of conveyors arranged in series relation and forming an endless circuit, a plurality of separate and independent cabs continuously traversing said circuit, said conveyors comprising conveying means for conveying and supporting the individual cabs independently of each other and in non-synchronized relation to said conveying means, one of said groups of conveyors including a low-speed conveyor followed by an accelerating conveyor, the speed of said low-speed conveyor being slow as compared to the speed of other parts of said circuit, said cabs in traversing said cricuit and because of their non-synchronized relation to said conveying means having an opportunity to acquire improper spacing therebetween while traversing the circuit, and means for automatically repositioning said cabs at least once while traversing the circuit, said means including bunching means for bringing adjacent cabs into physical contact with each other as they reach said low speed conveyor, whereby the contiguous accelerating conveyor of said group automatically resets the spacing of the cabs, said cabs being sufficient in number to provide a continuous line of cabs in end to end contacting relation at said low-speed conveyor.

10. The combination as set forth in claim 9, in which said bunching means includes means for delivering cabs to said low speed conveyor at a speed in excess of that of said low-speed conveyor.

11. The method of automatically respacing of cabs which are separately and independently continuously traversing an endless circuit made up of a plurality of conveyors which include a low speed conveyor followed by an accelerating conveyor, with the cabs being in non-synchronized relation to the conveyors, said method consisting in delivering the cabs to said low speed conveyor at a speed sufficiently great with respect to that of the low speed conveyor that the cabs are placed in contiguous physical contact with each other whereby the accelerating conveyor will peel the cabs from the low speed conveyor in pre-determined timed sequence.

12. In a cab turnaround for passenger transportation apparatus having adjacent ends of conveyors running in different directions, spaced sets of idle rollers aligned with the respective conveyor ends, spaced sets of driven rollers adjacent to said idle rollers and having successively different speeds, spaced idle rollers adjacent to said driven rollers, a spaced series of rollers having their axes on radii from a common center and driven individually at speeds corresponding to the distance from said common center to turn cabs, and spaced guides for turning cabs including an idler guide wheel rotating about the common center, and an outer guide curved about said common center whereby a cab is taken from the delivery end of one conveyor, turned around, and put on the receiving end of the adjacent conveyor running in the opposite direction.

13. In a cab turnaround for passenger conveying apparatus and the like having adjacent ends of conveyors running in different directions and at least one generally right-angled quadrilateral cab conveyed by the conveyors with the cab having a guide roller at each corner thereof, the combination therewith of an accelerating live roll conveyor in series with one of the conveyors, a decelerating live roll conveyor in series with the other of the conveyors, and a turnabout conveyor positioned between said accelerating and decelerating conveyors, said turnabout conveyor receiving from said accelerating conveyor and delivering to said decelerating conveyor, said turnabout conveyor comprising a series of spaced rollers having their axes on radii from the center of the turnaround, said spaced rollers being driven individually at speeds corresponding to the distance of each roller from said center, a generally horizontal idler wheel rotatably mounted at said center, a generally horizontal outer guide bar concentrically curved about and spaced from said idler wheel, said turnabout conveyor being positioned between said idler wheel and said outer guide bar, with the last roller of said accelerating conveyor being spaced from the first of said turnabout rollers a distance substantially equal to the length of the cab in the direction of travel, whereby the leading edge of the cab engages said first of said turnabout rollers as the trailing edge of the cab leaves said last accelerating roller, and at substantially the same time said outer guide bar is engaged by the guide rollers on the side of the cab adjacent it, and said idler wheel engages said other side of the cab to smoothly guide the cab around said turnabout conveyor.

14. A device of the type described comprising two endless conveyors running in different directions with an end of one conveyor positioned adjacent an end of the other conveyor, an accelerating live roll conveyor in series with said end of said one conveyor, a decelerating conveyor in series with said end of said other conveyor, a turnabout conveyor positioned between said accelerating and decelerating conveyors, said turnabout conveyor receiving from said accelerating conveyor and delivering to said decelerating conveyor, at least one generally quadrilateral cab conveyed by the conveyors, with the first roller of said accelerating conveyor being spaced from the delivering end of said one conveyor a distance substantially equal to the length of the cab in the direction of travel, whereby the leading edge of the cab engages said first accelerating conveyor roller as the trailing edge of the cab leaves said one conveyor, and means positioned between said accelerating conveyor and said one conveyor adapted to support each cab as it passes from said one conveyor to said accelerating conveyor.

15. In passenger apparatus of the type described including two cab transporting conveyors running in different directions and having an end of one adjacent an end of the other, and at least one cab conveyed by the conveyors including guide rollers on each side thereof, the improvement comprising an idler wheel positioned equidistantly between the adjacent ends of said conveyors, a guide bar concentrically curved about said idler wheel, and conveying means for transporting the cab between said idler wheel and said guide bar, said guide rollers on one side of the cab engaging said guide bar and said idler wheel engaging the other side of the cab to guide the movement of the cab as it passes between the idler wheel and guide bar, said means comprising a series of spaced rollers having their axes on radii from the center of the turnaround, said spaced rollers being driven individually at speeds directly proportional to the distance of each roller from said center, with the distance between the ends of said conveying means and the respective ends of said first mentioned conveyors being substantially equal to the length of the cab in the direction of travel, and means positioned between said ends of said conveying means and the respective ends of said first mentioned conveyors adapted to support the respective cabs as they pass from one conveyor to another.

16. The device set forth in claim 15 wherein said ends of said first mentioned conveyors and said ends of said conveying means are positioned with respect to each other so that as the cab engages the entrance end of said conveying means, said cab is engaged on one side by said idler wheel and said guide bar is engaged by the guide rollers on the side of the cab adjacent it, and as the cab leaves the exit end of said conveying means, said idler wheel disengages from the cab and the guide roller on leading corner of said one side of the cab disengages from said guide bar.

17. For use in passenger transportation apparatus of the type including a first and second series of continuous varying speed transport surfaces constituting portions of a closed circuit and running in different directions, with the delivery end of one being adjacent to the receiving end of the other and connected by a cab turnaround device, said apparatus being further characterized by having a plurality of separate independent cabs mounted for movement on said transport surfaces in nonsynchronized relationship thereto, and with the cabs bunched as they approach said turnaround device, the improvement which consists in interposing an accelerating conveyor between the delivery end of said one transport surface and the cab turnaround device, and means for decelerating the cabs before they are delivered to the receiving end of said other transport surface.

18. The combination as set forth in claim 17 in which said cab turnaround device transports said cabs at a constant speed corresponding to the speed at which the cabs leave said accelerating conveyor.

References Cited in the file of this patent

UNITED STATES PATENTS

| 374,736 | Floyd | Dec. 13, 1887 |
| 597,837 | Castle | Jan. 25, 1898 |
| 770,260 | Cahill | Sept. 20, 1904 |
| 935,631 | Adkins et al. | Oct. 5, 1909 |
| 999,885 | Seeberger | Aug. 8, 1911 |
| 1,198,605 | Trent | Sept. 19, 1916 |
| 1,412,969 | Sachs | Apr. 18, 1922 |
| 1,632,569 | Taylor | June 14, 1927 |
| 1,665,483 | Taylor | Apr. 10, 1928 |
| 1,756,653 | McArthur | Apr. 29, 1930 |
| 1,793,498 | L'Heritier | Feb. 24, 1931 |
| 1,900,914 | Cornet | Mar. 14, 1933 |
| 1,959,735 | Phillips | May 22, 1934 |
| 2,044,134 | Storer | June 16, 1936 |
| 2,566,417 | Holm | Sept. 4, 1951 |
| 2,580,054 | Vincent | Dec. 25, 1951 |
| 2,613,789 | McLaughlin | Oct. 14, 1952 |
| 2,701,049 | Kendall et al. | Feb. 1, 1955 |
| 2,729,324 | Howdle | Jan. 3, 1956 |
| 2,756,686 | Kendall et al. | July 31, 1956 |
| 2,789,710 | Desjardins | Apr. 23, 1957 |

FOREIGN PATENTS

| 733,952 | Canada | July 20, 1955 |
| 628,965 | Germany | Apr. 20, 1936 |